United States Patent [19]

Yamashita et al.

[11] 4,309,498
[45] Jan. 5, 1982

[54] ELECTROPHOTOGRAPHY USING A MAGNETIC BRUSH

[75] Inventors: Keitaro Yamashita, Kimisato; Ryuji Goto; Masumi Asanae, both of Kumagaya, all of Japan

[73] Assignee: Hitachi Metals, Ltd., Tokyo, Japan

[21] Appl. No.: 62,844

[22] Filed: Aug. 1, 1979

[30] Foreign Application Priority Data

Mar. 23, 1978 [JP] Japan ................................. 53-34044

[51] Int. Cl.³ ........................................... G03G 13/09
[52] U.S. Cl. .................................. 430/100; 430/126; 430/122; 118/657
[58] Field of Search ....................... 118/658, 653, 657; 355/3 DD; 430/122, 125, 126, 100

[56] References Cited

U.S. PATENT DOCUMENTS

| | | | |
|---|---|---|---|
| 3,909,258 | 9/1975 | Kotz | 430/122 |
| 3,926,627 | 12/1975 | Iwasa | 430/125 |
| 4,121,931 | 10/1978 | Nelson | 118/658 |
| 4,126,100 | 11/1978 | Nishihama et al. | 118/658 |

*Primary Examiner*—Richard L. Schilling
*Assistant Examiner*—John L. Goodrow

*Attorney, Agent, or Firm*—Sughrue, Mion, Zinn, Macpeak & Seas

[57] ABSTRACT

A method of electrophotography in which an electrostatic latent image is formed on the surface of a material layer and a non-magnetic cylinder is provided to confront the surface of said material layer. A permanent magnet roll made up of a plurality of symmetrically arranged magnetic poles extends axially in said cylinder. A magnetic brush is formed by attracting a semiconducting or insulating magnetic toner onto the cylinder with the aid of a magnetic attraction force of the permanent magnet roll. The cylinder and permanent magnet roll are moved relative to each other to permit the magnetic brush to slide along the surface of the material layer thereby to allow the magnetic toner to adhere at predetermined position on the surface of said material layer, and a toner image is transferred onto a transferring member and is then subjected to fixing. The cylinder and the permanent magnet roll are rotated in the same direction so that the magnetic toner is moved in the same direction as that of said material layer at a speed less than 100 mm/sec irrespective of the speed of movement of the surface of said material layer at a development section.

14 Claims, 18 Drawing Figures

DIRECTION OF MOVEMENT OF
PHOTO-SENSITIVE MATERIAL

ELECTROPHOTOGRAPHY USING A MAGNETIC BRUSH

BACKGROUND OF THE INVENTION

This invention relates to electrophotography in which a semiconducting or insulating magnetic toner is used and to developing an electrostatic latent image according to a magnetic brush method. The latent image thus developed is transferred onto a transferring member such as an ordinary sheet and is then subjected to fixing to obtain a copy.

In electrophotography, an electrostatic latent image is formed on the photo-conductive surface of a photo-sensitive material and is then developed to obtain a toner image. The toner image is either subjected directly to fixing, or after it is transferred onto a transferring member, it is subjected to fixing to obtain a copy.

The magnetic brush development method is extensively employed to develop an electrostatic latent image. Heretofore, a two-component system developer, which is a mixed powder comprising a non-magnetic toner and a carrier such as iron powder, has been employed as the developer in this method. In magnetic brush development methods using the two-component system developer, the toner is charged to have a predetermined polarity by the friction caused between the toner and the carrier. As a result only the toner is allowed to stick to the surface where the electrostatic latent image is formed. This method is advantageous in that the latent image can be readily transferred.

However, this method is still disadvantageous in the following points: It is necessary to provide a mixing means to charge the toner by the utilization of the friction caused between the toner and the carrier. Furthermore, it is necessary to use a toner supplying means in order to maintain a uniform density of toner because only the toner is consumed during development. Therefore, the size of the developing device is necessarily large. If the developer is used for extended periods of time, the carrier deteriorates, and therefore it is necessary to replace the carrier.

In order to eliminate the above-described difficulties, a one-component system non-chargeable magnetic toner comprised essentially of resin and magnetic powder is employed as the developer. A development method using this magnetic toner is disclosed in the specification of Japanese Patent Application Laid-Open No. 4532/1974. In this development method, an electrically conductive magnetic toner having an electrical resistance of the order of $10^4$–$10^{11}$ $\Omega$cm under the application of an electric field of DC 100 V/cm is used as the magnetic toner.

An electrically conductive sleeve is employed to carry the magnetic toner and the rear surface of an electrostatic latent image carrier is electrically connected to the electrically conductive sleeve so that an electrically conductive path is formed between the surface of the electrostatic latent image carrier and the sleeve through the conductive magnetic toner layer. Hence, the charges which are induced on the conductive sleeve by the charges of the electrostatic latent image and are opposite in polarity to those of the electrostatic latent image are collected into the top of the toner brush. Also, the conductive sleeve and the electrostatic latent image carrier are moved relatively so that a coulomb force created by both the charges in the top of the toner brush and the charges of the electrostatic latent image overcome the magnetic attraction force of a permanent magnet roll provided in the conductive sleeve. This permits the toner to selectively deposit on the surface of the electrostatic latent image.

This method may be applied to a so-called coated paper copying or CPC system in which a toner image obtained through development is fixed to directly obtain a copy because the toner is electrically conductive. However, in applying the method to the CPC method, it is necessary to provide a means of forming an electrically conductive path at all times, for instance, by grounding a rotary member, and therefore the construction of the developing device becomes necessarily intricate. In addition, electrical paths are formed between toners, and therefore if the toners are strongly charged in one polarity, a fog-like condition is created.

In the method in which the electrically conductive toner is used and development is effectuated with the electrically conductive sleeve, the electrical resistance of the toner is relatively low, and therefore transferring the toner image onto the transferring member involves the problem where the toner is scattered or the transferring electric field is weakened because of leakage. Accordingly, this method cannot be applied to a so-called plain paper copying or PPC system in which a copy is obtained through development, transferring and fixing processes; that is, as the toner's electrical resistance is low, the transferring efficiency is low. Therefore, it is impossible to provide a copy having a desired density. Furthermore, in the case where the above-described developing method is applied to the PPC developing system, with a semiconducting or insulating non-chargeable type magnetic toner poor in development characteristic and high in resistance, the amount of toner stuck to the photo-sensitive material is decreased, and accordingly an excellent copy cannot be obtained.

Another example of the magnetic brush development method for the CPC system is described in the specification of Patent No. 4,126,100 to Nishihama. In this method, in moving the non-magnetic sleeve and the photo-sensitive material at a substantially equal speed, the gap between the non-magnetic sleeve and the photo-sensitive material is adjusted so that a toner pool is formed upstream of the development section, and the gap is made smaller than the thickness of toner to further create a physical disturbance to the toner in the toner pool. In this conventional method, the magnet roll provided in the sleeve is rotated in a direction opposite to the direction of rotation of the sleeve in order to magnetically disturb the toner in the toner pool. If the magnet roll and the sleeve are rotated in opposite directions, then the apparent speed of movement of the toner is increased, so that an excessively great force is applied to the toner. As a result blocks of toner are liable to be formed because the toner is essentially made of soft resin and is weak in mechanical strength.

Furthermore, both a rotation force due to the rotating magnetic force of the magnet roll and a revolution force due to the movement of the sleeve are applied to the toner, so that the toner is carried at high speed and the toner brush strongly rubs the photo-sensitive surface. As a result, the photo-sensitive material is deteriorated. Thus, this method is not practical. In the case where the method is applied to the PPC development system, the development characteristic is similarly low as in the method described in the above-described U.S.

patent, and the density and tone of a copy obtained with the PPC magnetic toner are unsatisfactory.

In order to apply the magnetic toner to the PPC development system, a method has been proposed in which the development is carried out by using an insulating magnetic toner whose electrical resistance is increased, and then the transferring process is performed. For instance, Japanese Patent Application Laid-Open No. 92137/1975 discloses a method in which a magnetic toner having an electrical resistance of $10^6$–$10^{16}$ $\Omega$cm is brought into contact with an electrostatic latent image for polarization. However, this conventional method involves particularly difficult practical problems. For instance, if a magnetic toner having a low electrical resistance of the order of $10^6$ $\Omega$cm is transferred, then the toner image is greatly deformed because of the low electrical resistance. Accordingly, magnetic toner cannot be used.

If a magnetic toner having a high electrical resistance of $10^{12}$ $\Omega$cm or higher is used, it is impossible to carry out development in the conventional developing method because of the excessively high electrical resistance. In addition, it is apparent that it is impossible to obtain satisfactory development merely by bringing the toner closer to the electrostatic latent image, or with a weak polarization force, as in the method. It is necessary to use a semiconducting or insulating magnetic toner having an electrical resistance of $10^8$ $\Omega$cm or higher for transferring the toner image. In order to correctly develop the latent image on the photo-sensitive material by sticking such a toner thereto, it is necessary to provide a mechanism for generating a force to stick the toner thereto.

Another developing method applicable to the PPC system has been disclosed by Japanese Patent Laid-Open No. 129639/1978. In this conventional method, the sleeve is rotated in such a manner that the difference in speed between the sleeve and the photo-sensitive material is within a predetermined range, to eliminate the occurrence of those image, edge effects and fog. In this method, only the sleeve is rotated. Accordingly, it is difficult to uniformly control the toner at the doctor section; that is, blocks of toner or dust is liable to be caught by the doctor section. As a result, strips due to insufficient development may appear by the shortage of toner on the sleeve. In addition, since the magnetic brush is dynamically struck against the position where the toner is brought into contact with the development surface, the abrasion force is increased. This is effective for cleaning, but lowers the development characteristic. Furthermore, necessarily it is difficult to allow the toner to stick to the half tone region where the potential of the electrostatic latent image is low, and the resultant image is hard and is not a correct copy of the original.

In a developing device according to the sleeve rotation system as disclosed by the above-described Japanese Patent Application Laid-Open No. 129639/1978, the positions of the magnetic poles are fixed, and therefore if the positional relation of the magnetic poles is even slightly changed, the quality of the resultant image is greatly changed. Thus, the developing device suffers from the necessity of finely adjusting the positions of the magnetic poles. The development gap and the doctor gap are defined in the developing device, so that the toner strongly abrades the photo-sensitive material. Furthermore, the development characteristic, that is, the toner adhesion characteristic to the photo-sensitive material is lowered when the toner movement speed is high as in the sleeve rotation system (described later). Thus, the developing device is not applicable to a PPC development system using a high resistance toner.

As is apparent from the above description, it is impossible to provide an excellent image by the sleeve rotation system. In order to improve the sleeve rotation system, a method has been proposed by Nelson in U.S. Pat. No. 4,121,931. In this conventional method, the toner movement speed is increased to improve the development characteristic of the insulating magnetic toner. Especially, even with an insulating magnetic toner, the toner is forcibly charged by bringing it in contact with the electrodes and is then carried to the latent image surface at a speed higher than 10 cm/sec. This obtains a development characteristic equivalent to that of the case of the electrically conductive toner. However, this conventional method still has the above-described drawbacks accompanying the sleeve rotation system, and additionally a drawback is caused by the higher toner movement speed with respect to the photo-sensitive material.

The specification of Nelson describes that the magnet roll may be rotated instead of the sleeve, or both the magnet roll and the sleeve may be rotated. In any case, the toner movement speed is high, and therefore the above-described problem cannot be solved.

The toner described in the above mentioned specification should have a conductivity $10^{-12}$ $\Omega$/cm or less under the application of an electric field of DC 10,000 $\Omega$/cm to improve the transferring characteristic. The conventional method of the above-described specification is based on the technical concept where, as described later, a magnetic toner charged before the development is carried at a high speed similar to the two-component system toner, to increase the developing current. This increases the amount of toner adhesion. However, since development is greatly affected by the kinds of photo-sensitive materials, the kinds of toners, the magnetic force of a magnet roll, or the like, it cannot be considered that this conventional method is a practical magnetic toner development method.

The mechanism of development will now be described in more detail. As is described in the specification of the aforementioned Nelson patent, as the toner is brought into contact with the latent image surface at higher speed, that is, the speed of the toner leaving the latent image surface is increased, the cleaning effect of the magnetic brush is increased. Therefore, although the toner charged by the electrodes is stuck to the latent image surface with the aid of the coulomb force, it is recovered from the latent image surface, thus lowering the development efficiency.

This drawback may be eliminated by increasing for example the rotational rate of the sleeve. However, in this case, the amount of charge of the toner becomes short, and a cleaning effect is provided by a strong abrasion force which is generated when the magnetic brush passes over the development surface. As a result the development efficiency is further lowered. Thus, it is impossible to obtain excellent development merely by controlling the toner movement speed and the amount of charges of the toner.

The specification of the aforementioned Patent to Nelson describes an embodiment where the magnet roll and the sleeve are rotated in the opposite directions at 1500 r.p.m. and 300–400 r.p.m., respectively. However, in this method, the toner movement speed is very high, and therefore the above-described difficulty accompanying the increase of the toner movement speed to 10 cm/sec or higher cannot be eliminated. The toner movement speed is the sum of the sleeve speed and the magnet sleeve; that is, it is the sum of the speed of rotation of the toner and the speed of revolution are the same due to the peripheral velocity of the sleeve. Thus, the toner movement speed is considerably increased. Furthermore, even if the high resistance magnetic toner for the PPC system can develop the latent image on the photo-sensitive material, although the developed image is insufficient, nothing is taken into account for transferring the developed image onto a transferring member in the conventional method. Accordingly, it is obvious that an excellent copy cannot be obtained simply by the above-described developing method in view of the copying process.

In order to improve the development characteristic in the use of the high resistance magnetic toner, a developing method has been disclosed by Japanese Patent Application Laid-Open No. 117432/1975. In this conventional developing method, a toner is forcibly charged by using a corona charger, or electrodes such as doctor blades. Thus, the developing method is similar to the method of using the two-component system toner in which the toner is charged before development. It cannot be considered possible to put the method in practical use because the method involves difficulties such as the occurrence of leakage in the process of up to development and non-uniform charging due to dirty conditions of the charger.

As is apparent from the above description, the insulating magnetic toner lowers the development characteristic, and the semiconducting or conducting magnetic toner lowers the transferring characteristic. It is generally considered impossible to improve the development characteristic according to the conventional methods. Accordingly, a variety of magnetic toner PPC copying machines recently developed use toners having a relatively low electrical resistance of the order of $10^7$–$10^9$ $\Omega$cm to achieve an excellent development characteristic. In this connection, in order to improve the transferring characteristic, a transferring sheet whose saturation potential is not significantly decreased under an environmental condition of high humidity as disclosed by Japanese Patent Application Laid-Open No. 38752/1978 has been proposed. Also, a transferring sheet having a high volumetric resistivity at a high humidity as disclosed by Japanese Patent Application Laid-Open No. 131044/1978 has been proposed.

However, as a result of tests of the former transferring sheet, it has been found that with the transferring sheet whose saturation potential is not significantly decreased at a high humidity, it is impossible to satisfactorily transfer magnetic toner thereof. This is especially true in the case where the saturation potential is excessively high: it is difficult to peel the transferring sheet off the photo-sensitive material after the transferring operation, and the image is deformed by electrical discharge. If in contrast, the saturation potential is excessively low, the toner image cannot be transferred satisfactorily due to the leakage of transferring charges. In the case where a transferring sheet is used which has no problem for transferring the two-component system toner, with the one-component system toner the above-described deformation of the image caused in the transferring operation can be avoided. Therefore, it is considered essential to define some characteristics other than the saturation potential.

In the aforementioned Japanese Patent Application Laid-Open No. 131044/1978, the volumetric resistivity of the transferring sheet is defined. However, as a result of a detailed investigation, the inventors have confirmed that if the volumetric resistivity is $10^{10}$ $\Omega$cm or higher, the resultant transferring characteristic is insufficient for the transferring sheet of the one-component system magnetic toner.

SUMMARY OF THE INVENTION

Accordingly, an object of this invention is to provide method of electrophotography in which all of the drawbacks accompanying conventional electrophotography have been eliminated.

It is another object of this invention to define a method of electrophotography in which both the development and transferring characteristics are excellent, and a copy image satisfactory in practical use can be stably and readily obtained.

Provided by this invention is a method of electrophotography in which an electrostatic latent image is formed on the surface of a material layer. A non-magnetic cylinder is provided to confront the surface of the material layer and a permanent magnet roll made up of a plurality of symmetrically arranged magnetic poles extending axially is provided in the cylinder. A magnetic brush is formed by attracting a semiconducting or insulating magnetic toner onto the cylinder with the aid of a magnetic attraction force of the permanent magnet roll and the cylinder and permanent magnet roll are moved relatively to permit the magnetic brush to slide along the surface of the material layer to allow the magnetic toner to stick to a predetermined position on the surface of the material layer. The toner image is transferred onto a transferring member and is then subjected to fixing. According to the invention, the cylinder and the permanent magnet roll are rotated in the same direction so that the magnetic toner is moved in the same direction as that of the material layer at a speed less than 100 mm/sec irrespective of movement of the surface of the material layer at a development section.

This invention will be described in detail with reference to its preferred embodiments.

DESCRIPTION OF THE PREFERRED EMBODIMENTS

Figure 1:
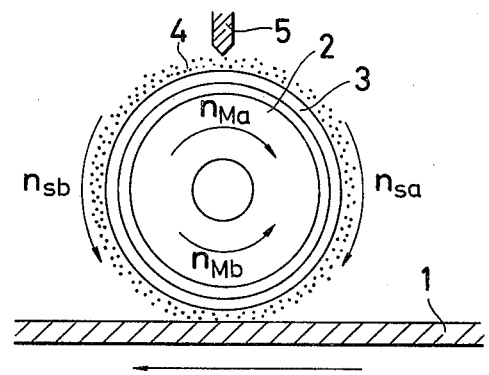
FIG. 1 is a schematic sectional view of a developing device for a description of a developing method according to this invention.

As described before, there are a variety of methods of carrying magnetic toner on the cylinder. The inventors have studied under various conditions how to provide a best method of toner conveyance. Referring to FIG. 1, the number of revolution of a magnet 2 made of ten magnetic poles symmetrically arranged and having 600 gauss on a sleeve 3, 29.3 mm in outside diameter, a sleeve 31.4 mm in outside diameter, and the number of revolution of the sleeve 3 are set to 100 to 1500 r.p.m. and 10 to 300 r.p.m., respectively. The gap between a photo-sensitive material 1 at a development section and the sleeve 3 (hereinafter referred to as "a development gap" when applicable) and a gap for regulating the amount of magnetic toner 4 (hereinafter referred to as "a toner reglulating amount") carried on the sleeve 3 with the aid of a doctor blade 5 are set to 0.2 to 0.8 mm and 0.51 to 1.0 mm, respectively.

The magnetic toner has a volumetric resistivity of $10^{11}$ Ωcm with the application of an electric field of DC 4000 V/cm. A Se drum 210 mm in outside diameter is employed as the photo-sensitive material, and the surface potential of the Se drum is set to +800 V. The drum is rotated at a peripheral velocity of 60 mm/sec. Under the above-described conditions experiments have been performed. In this connection, if the method of carrying the toner is taken into account, then ten different developing methods can be considered. The experimental results are an indicated in Table 1 below:

TABLE 1

| | | Magnet rotating direction $N_M$ | | | | | |
|---|---|---|---|---|---|---|---|
| | | a | | stop | | b | |
| | | | | Toner Moving | | | |
| $N_S$ | | a | b | a | b | a | b |
| sleeve | a | ⊚ | X | Δ | / | Δ | / |
| rotating | stop | / | X | / | / | Δ | / |
| direction | b | / | X | / | Δ | ⊚ | X |

⊚Excellent development
ΔRather poor development, including poor half-tone reproducibility
X Poor development, and high in fog density In Table 1, reference characters $N_M$ and $N_S$ designate the revolutions per minute of the magnet and the sleeve, respectively, and reference characters a and b designate the clockwise and counterclockwise rotations thereof, respectively. The photo-sensitive material is moved from right to left as viewed in FIG. 1. From the above-described experiments, the following has been confirmed.

In the case where only the sleeve is rotated, the resultant image is relatively hard, and the photo-sensitive material is liable to be damaged. It is preferable that the direction of movement of the toner be the same as the direction of movement of the photo-sensitive element. In the case where only the magnet is rotated and the toner is moved in the same direction as that of the photo-sensitive material, a relatively satisfactory image is obtained. However, in this case, the resultant image is not clear at low speed. At high speed, the development is poor, the density is low, and it is difficult to adjust the gap.

In the case where both of the magnet and the sleeve are rotated, and especially in the case where the magnet and the sleeve are rotated in the same direction and the direction of carrying the toner at the development section coincides with the direction of movement of the photo-sensitive material, an excellent image is obtained. Thus, in the case of rotating the magnet and the sleeve in the same direction, no fog phenomenon is caused, and the toner is suitably brought into contact with the photo-sensitive material because the direction of carrying the toner is opposite to the direction of rotation. As a result, the abrasion force is appropriate, and the toner pool can be readily controlled.

In the system of rotating both of the magnet and the sleeve in the same direction, the speed of movement of the toner ($V_T$) can be expressed by the following equation (1):

$$V_T = \frac{\pi \cdot D \cdot N_S}{60} - \frac{1}{60} \frac{\pi \cdot D \cdot h \cdot M(N_M - N_S)}{\pi \cdot D - h \cdot M} \text{ (mm/sec)} \quad (1)$$

where:
D—the diameter (mm) of the sleeve,
$N_S$—the revolution per minute (r.p.m.) of the sleeve,
$N_M$—the revolution per minute (r.p.m.) of the magnet
h—the height of the top of the magnetic brush, and
M—the number of magnetic poles of the magnet.

In equation (1), the first term represents the speed of revolution of the toner due to the rotation of the sleeve, and the second term, the speed of rotation of the toner due to the rotary magnetic field of the magnet.

The equation (1) can be rearranged as follows:

$$V_T = \frac{\pi \cdot D \cdot N_S}{60} \left(1 + \frac{h \cdot M}{\pi \cdot D - h \cdot M}\right) - \frac{1}{60} \frac{\pi D h \cdot M}{\pi \cdot D - h \cdot M} N_M \text{ (mm/sec)} \quad (2)$$

If, with the regulated amount of toner (or toner regulating amount) being 0.2 mm, the height of the top of the magnetic brush is 0.84 mm, D is 32 mm, and M is 10, then the equation (2) can be rewritten as follows:

$$V_T = 0.153 (12 \cdot N_S - N_M) \text{ (mm/sec)} \quad (3)$$

If, in the system of rotating both of the magnet and the sleeve according to the invention, the toner is moved in the same direction as a photo-sensitive material at the development section, then satisfactory development can be obtained whether the directions of rotation of the magnet and the sleeve are the same or opposite. However, as a result of various investigations made by the inventors, it is found that a satisfactory result can be obtained by setting the ratio of the r.p.m. ($N_S$) of the sleeve to that ($N_M$) of the magnet as described below: With the ratio $N_S/N_M$ approximately 1/20, the toner is moved in the same direction as the magnet. However, if the ratio is less than 1/20, the toner is moved in a direction opposite to those of the sleeve and the magnet. If the ratio $N_S/N_M$ is larger than 1/5, the operating conditions approach those in the case of rotating only the sleeve. As a result, the image becomes relatively hard, the toner is splashed or scattered, and an excessive force is applied to the toner, whereby the toner essentially containing soft resin is solidified. If the ratio $N_S/N_M$ is smaller than 1/200, then the operating conditions approach those in the case of only rotating the magnet, which is also undesirable.

Accordingly, in the case where the toner is moved in the same direction as the sleeve and the magnet, the ratio $N_S/N_M$ should be within the range of from 1/20 to 1/200. However, it should be noted that, since the value $V_T$ is a function of the values d and h, from the above-described equation (1), the value $N_S/N_M$ is varied with the height (h) of the magnetic brush.

The condition for the rate of revolutions per minute of the magnet and the sleeve when the speed of movement of the toner ($V_T$) is zero in the equation (2) is zero (0), is as follows:
In the equation (2), $V_T = 0$, then $$\frac{N_M}{N_S} = \frac{\pi \cdot D}{h \cdot M} \quad (4)$$

In the equation (4), the condition for $V_T = 0$ depends on the length of the toner brush, i.e., the height (h) of the magnetic brush even if the sleeve having the same outside diameter D and the magnet having the same number of magnetic poles (m). For instance, when the value (h) is decreased, the ratio $N_M/N_S$ is decreased. Therefore, if the value $N_M$ is constant, then it is necessary to increase the value $N_S$ to obtain the condition for $V_T = 0$. Thus, it is necessary to take into consideration the critical condition in the case where the magnet and the sleeve are rotated in the same direction and the toner is moved in a direction identical to or opposite to the direction of rotation of the magnet and the sleeve depends on the length (h) of the toner brush. The value (h) is in close relation with the regulated amount (d) of toner, as described later.

Figure 2:
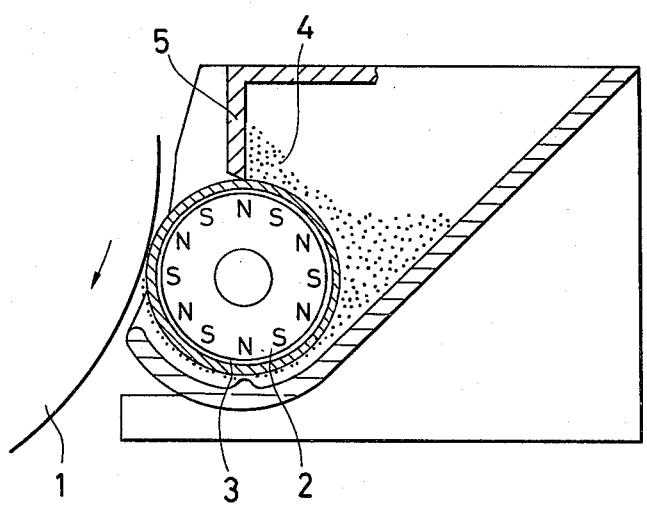
FIG. 2 is a sectional view showing one example of a developing device employed in the invention.

According to the above-described experimental results, development conditions have been investigated in more detail with a developing device which, as shown in FIG. 2, is operated according to the system of rotating the magnet and the sleeve in the same direction. In FIG. 2, those components which have been previously described with reference to FIG. 1 have therefore been similarly numbered. A magnet 29.3 mm in outside diameter, having ten symmetrically arranged magnetic poles and a magnetic force of 570 gauss on the surface of a stainless steel sleeve 32 mm in outside diameter is employed to obtain the relationships between the toner, regulating amount, the thickness of the magnetic brush on the magnetic pole, i.e., the height of the top of the magnetic brush, and the thickness of the magnetic brush between the magnetic poles, i.e., the height of the bottom of the magnetic brush.

Figure 3:
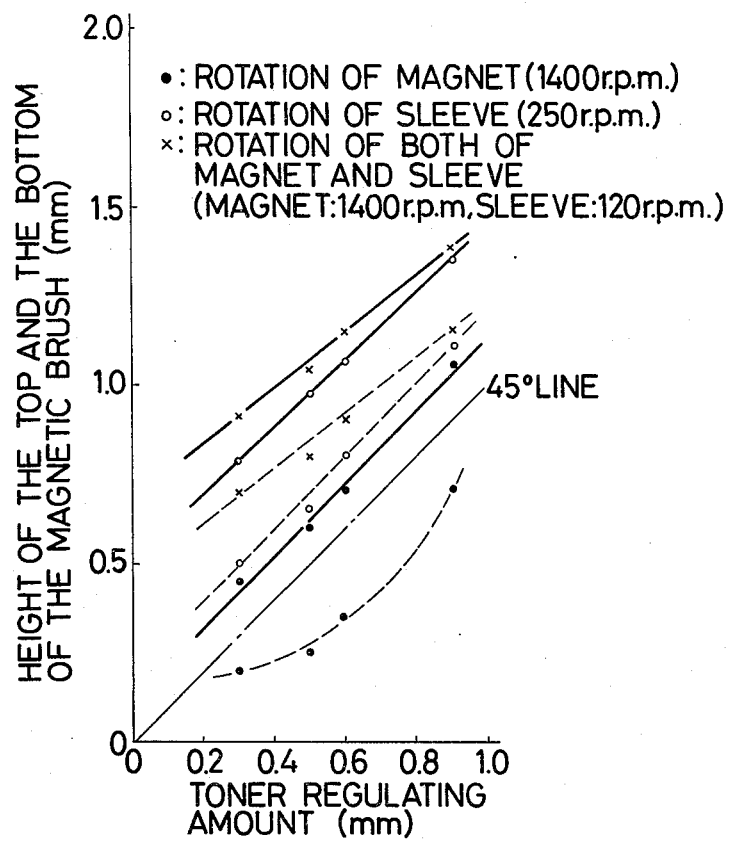
FIG. 3 is a graphical representation indicating the relation between a toner regulating amount and the dimension of a magnetic brush.

The results are as indicated in FIG. 3, in which the solid line and the broken line indicate the height of the top and the bottom of the magnetic brush, respectively. In the case where only the magnet is rotated, the height of the top of the magnet brush is substantially equal to the sum of the toner regulating amount and 0.1 mm. In the case where only the sleeve is rotated, the height of the top of the magnetic brush is substantially equal to the sum of the toner regulating amount and 0.5 mm, that is, the height is greater than that when only the magnet is rotated. In the case where the toner is moved in the same direction as the magnet and the sleeve, the height of the top of the magnetic brush is substantially equal to a value obtained by adding 0.6 mm to the toner regulating amount. That is, the height of the magnetic brush is further increased, as a result of which the conveyance of toner is improved.

As apparent from these results, in the case of rotating both of the sleeve and the magnet, the toner can be readily carried through the narrow gap, and therefore the toner, being not affected by dirt or dust, can be carried in a stable manner with the thickness being uniform. Since the carrying force is higher than the torque of the magnet and lower than the torque of the sleeve, it can be readily understood that this system can break the block of high resistance magnetic toner for PPC which is poor in fluidity and is liable to solidify. The system is the most stable toner carrying system among the various toner carrying systems.

The amount of contact in the case of rotating both of the sleeve and the magnet has also been studied to achieve best results. It is found that satisfactory development can be obtained by setting the amount of contact to a value slightly less then the height of the base, that is, a value obtained by 0.2–0.3 mm to the toner regulating amount. In addition, in the case also where the magnet and the sleeve are rotated in the opposite directions, substantially the same effect is obtained.

Figure 4:
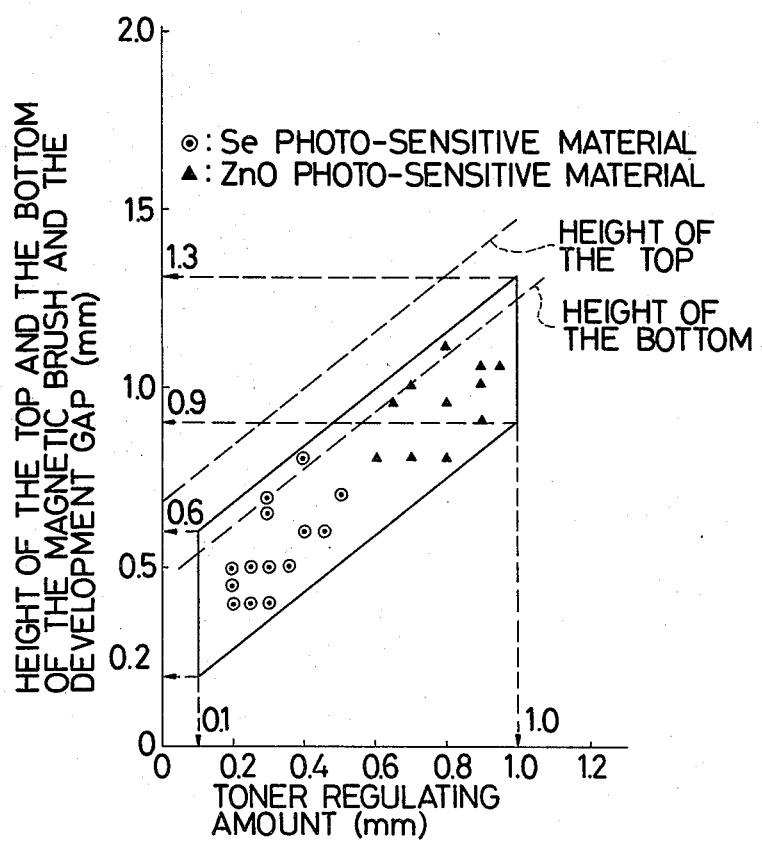
FIG. 4 is a graphical representation indicating the relation between a toner regulating amount and a development gap.

Furthermore, with a ZnO photo-sensitive material and a Se photo-sensitive material, the relationships between the toner regulating amount, the development gap, and the height of the magnetic brush have been researched for satisfactory development. The results are as indicated in FIG. 4. In FIG. 4, the dots are obtained by plotting data which have been provided satisfactory development. Thus, it is apparent that satisfactory development can be obtained by using the data surrounded by the solid lines. In other words, satisfactory development can be obtained if the toner regulating amount and the development gap are in a range defined by straight lines connecting coordinates (0.1, 0.2), (1.0, 0.9), (1.0, 1.3) and (0.1, 0.6).

As is clear from the above described results, the system of rotating both of the magnet and the sleeve is best. In this connection, the conditions of actual use have been studied.

Figure 5:
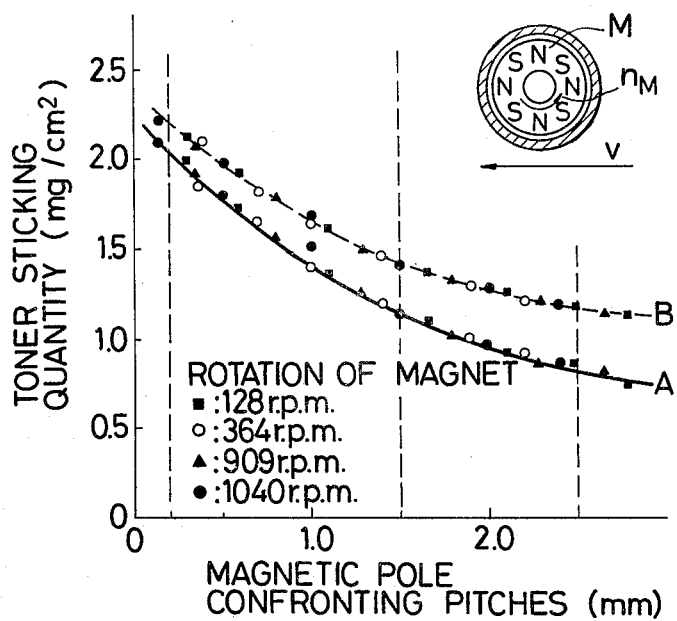
FIG. 5 is a graphical representation indicating the relation between magnet pole confronting pitch and toner sticking quantity.

First, the preferred range of r.p.m. of the magnet has been researched, and the results are as indicated in FIG. 5. FIG. 5 indicates the relationships between magnetic pole confronting pitches P (mm) on photo-sensitive material and toner sticking quantities (mg/cm$^2$) when the number of revolution per minute of the magnet is changed with the velocity of movement of the magnet on the Se Photo-sensitive plate set to 30 to 500 mm/sec. The term "magnetic pole confronting pitch" is intended to mean a value obtained by dividing the distance of movement of the photo-sensitive material in a unitary time by the number of times of passage of the magnetic pole in the same unitary time. When the amount of toner on the sleeve is short, then it is observed as a stripe-like development fog.

In FIG. 5, curve A indicates the results in the conventional method in which only the magnet is rotated, while curve B indicates the results in the method according to the invention in which both of the sleeve and the magnet are rotated in the same direction. As is apparent from these curves, the system according to the invention greatly improves the developing characteristic. In the above-described experiment, the number of revolutions per minute of the sleeve has been set to 1/10 of the number of revolutions per minute of the magnet.

If it is assumed that the velocity of movement of the photo-sensitive material is represented by V mm/sec, the number of magnetic poles of the magnet is represented by M, and the r.p.m. of the magnet is represented by $N_M$, then the magnetic pole confronting pitch P (mm) can be expressed by the following equation (4):

$$P = \frac{V}{\frac{N_M}{60} \cdot M} \quad (4)$$

In this case, the magnetic toner having a volumetric resitivity of $10^{11}$ Ωcm under the application of an electric field of DC 4000 V/cm has been employed.

Figure 6:
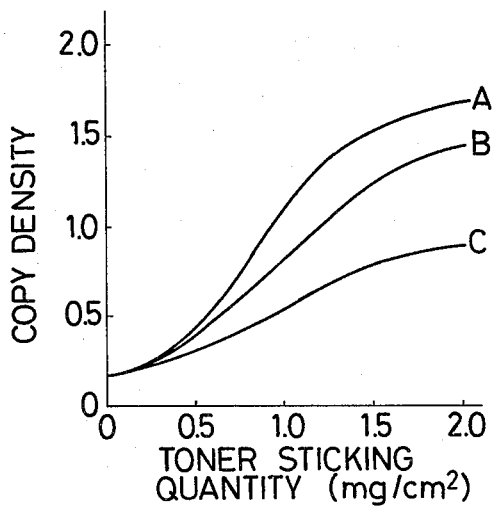
FIG. 6 is a graphical representation indicating the relation between a toner sticking quantity and a copy density.

If the toner sticking quantity is evaluated from the speed factor which has been standardized by the magnetic pole confronting pitch P, then the preferred r.p.m. of the magnet can be determined with respect to FIG. 6.

FIG. 6 shows experimental results indicating the relationships between toner sticking quanties and copy densities. In FIG. 6, the curves A, B and C indicate the results of pressure fixing, heat-roll fixing and oven fixing operations, respectively. In practice, the copy density should be at least 0.8. For this purpose the toner sticking quantity to be stuck to the photo-sensitive material should be at least 0.8 mg/cm$^2$ in the case of pressure fixing, and 1.6 mg/cm$^2$ in the case of oven fixing. Accordingly, it can be understood from FIGS. 5 and 6 that satisfactory development is obtained if the value P is in the range of from 0.2 to 2.5 mm, i.e., if the r.p.m. of the magnet is selected to be within the range. If the value P is smaller than 0.2 mm, then the toner is scattered, and heat is generated in the sleeve by eddy currents because the r.p.m. of the magnet is excessively high. In order to improve the development characteristic, it is preferable to set the value P to less than 1.5 mm.

Next, the range of best r.p.m. of the magnet when both of the magnet and the sleeve are rotated, has been studied. As the r.p.m. of the magnet is increased, the development characteristic is improved as much. Therefore, the developing device as shown in FIG. 2 has been employed in this study. More specifically, experiments have performed under the conditions that the r.p.m. of the magnet is set to 1200, the r.p.m. of the sleeve is changed in the range of 17-460 r.p.m., the development gap and the doctor gap are changed in the ranges of 0.4-0.6 mm and 0.2-0.4 mm, respectively, and a magnetic toner having a volumetric resistivity $5 \times 10^{14}$ Ωcm under an electric field of 4000 V/cm. The experimental results are as indicated in Tables 2 through 5.

TABLE 2

| Development gap (mm) | Toner regulating amount (mm) | | | | | |
|---|---|---|---|---|---|---|
| | 0.2 | 0.25 | 0.3 | 0.35 | 0.4 | 0.45 |
| 0.4 | ⊚ | ⊚ | ⊚ | / | / | / |
| 0.5 | ○ | ○ | ⊚ | ⊚ | ○ | / |
| 0.6 | / | / | Δ | ○ | ○ | / |

TABLE 3

| Toner regulating amount (mm) | Sleeve r.p.m. | | | | | | | | |
|---|---|---|---|---|---|---|---|---|---|
| | 17 | 50 | 100 | 150 | 200 | 250 | 300 | 350 | 400 |
| 0.2 | ○ | ○ | ⊚ | ⊚ | ⊚ | X | X | Δ | Δ |
| 0.25 | Δ | ○ | ⊚ | ⊚ | ⊚ | ⊚ | ⊚ | X | Δ |
| 0.3 | Δ | ○ | ⊚ | ⊚ | ⊚ | ⊚ | ⊚ | ○ | Δ |

Note: The development gap is 0.4 mm.

TABLE 4

| Toner regulating amount (mm) | Sleeve r.p.m. | | | | | | | | |
|---|---|---|---|---|---|---|---|---|---|
| | 17 | 50 | 100 | 150 | 200 | 250 | 300 | 350 | 400 |
| 0.2 | / | ○ | Δ | / | / | / | / | / | / |
| 0.25 | Δ | Δ | ○ | ○ | ○ | Δ | Δ | Δ | Δ |
| 0.3 | Δ | Δ | ○ | ⊚ | ⊚ | ○ | X | Δ | / |
| 0.35 | Δ | ○ | ○ | ○ | ⊚ | ⊚ | ⊚ | ○ | Δ |
| 0.4 | X | X | ○ | Δ | Δ | / | / | / | / |

Note: The development gap is 0.5 mm.

TABLE 4

| Toner regulating amount (mm) | Sleeve r.p.m. | | | | | | | | |
|---|---|---|---|---|---|---|---|---|---|
| | 17 | 50 | 100 | 150 | 200 | 250 | 300 | 350 | 400 |
| 0.3 | X | Δ | Δ | Δ | Δ | Δ | Δ | Δ | Δ |
| 0.35 | Δ | ○ | ○ | ○ | ○ | Δ | Δ | Δ | Δ |
| 0.4 | X | Δ | Δ | ○ | ○ | ⊚ | ⊚ | Δ | Δ |
| 0.45 | Δ | Δ | Δ | ○ | ○ | ○ | ⊚ | Δ | Δ |

Note: The development gap is 0.6 mm.

Table 2 indicates the results in the case where the r.p.m. of the sleeve is 150. In Tables 2 through 5, symbols ⊚, ○, Δ and X mean "Excellent", "satisfactory", "Fair" and "Poor" in development characteristic and image quality.

As is apparent from Tables 2 through 5, it is necessary to set the r.p.m. of the sleeve to a value in the range of from 50 to 300 r.p.m. and to set the development gap to a value obtained by adding 0.2-0.3 mm to the toner regulating amount, for acceptable development. With the r.p.m. of the sleeve less than 60, it has been observed that the toner is moved in a direction opposite to that of the sleeve and the magnet.

Figure 7:
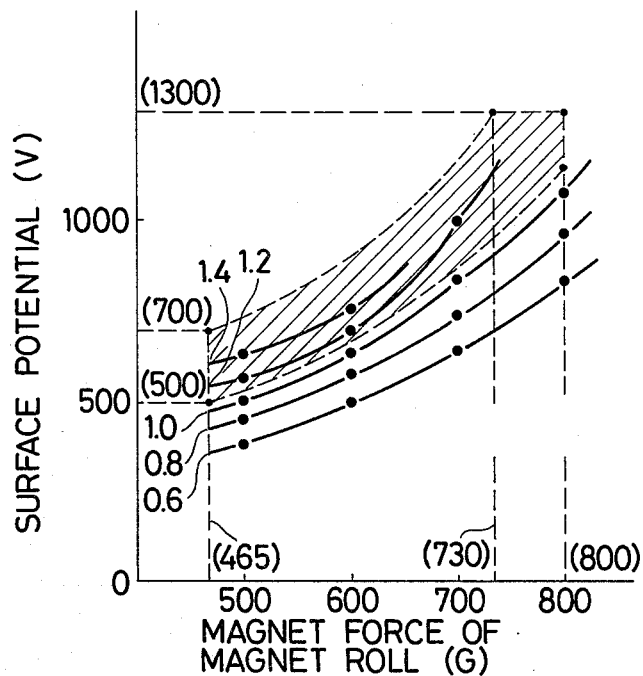
FIG. 7 is a graphical representation indicating the relation between the magnetic force of a magnet roll and the surface potential of a photo-sensitive material.

In order to obtain a copy density practiced in use, it is necessary to take into account not only the numbers of revolution of the magnet and the sleeve but also the magnetic force of the magnetic. With respect to the data in FIG. 5, the surface potential of the Se photo-sensitive material, being 1000 V, is higher than that in a practical range. Therefore, the relationships between the magnetic force of the magnet on the sleeve, the surface potential of the photo-sensitive material, and the copying density have been investigated. The results of the investigation are as indicated in FIG. 7. In this case, a Se photo-sensitive material has been employed.

More specifically, the investigation has been performed with the developing device shown in FIG. 2 using the same toner as in the case of FIG. 5 under the conditions where the r.p.m. of the magnet is set to 1200, the r.p.m. of the sleeve is set to 115, and the development gap and the toner regulating amount are set to 0.3 mm and 0.6 mm, respectively. The following are clear from FIG. 7. That is, with the Se photo-sensitive material having a surface potential of 500 to 1300 V, it is unnecessary to provide a magnetic force exceeding 800 gauss which is employed in the conventional CPC magnetic toner system. Copying density sufficient for practical use can be obtained by selecting the magnetic force within a range of 400 to 800 gauss.

On the other hand, experiments similar to those in the case of FIG. 7 have been carried out with a ZnO photo-sensitive material acknowledged to be excellent in development characteristic. In this case, images without fog have been obtained at a density of more than 1.4 under a surface potential of 300–600 V. It is preferable that the magnetic force of the magnet be more than 850 gauss and it is more preferable that it is more than 1000 gauss and less than 1600 gauss. However, even with the ZnO photo-sensitive material, if the development gap and the toner regulating amount are suitably selected, then an excellent image without fog can be obtained with a magnetic force less than 850 gauss.

It should be noted that FIG. 7 shows merely one example. Although the relationships between the surface potential and the magnetic force depend on the electrical resistance of the toner, the development gap, the number of revolutions of the magnet, and the type of photo-sensitive material, a practical satisfactory developing condition can be obtained from the above-described conditions.

All the developing conditions necessary for practicing the present invention, such as the magnetic force of the magnet, the toner carrying system, and the condition of contact with the photosensitive material, can be obtained from the above described material. In addition, the reasons why the developing system in which the sleeve and the magnet are rotated in the same direction results in a more excellent development than that in the prior art, and the areas where the developing system according to the invention differ from the conventional system will be described with reference to the results of measurement of developing currents.

According to U.S. Pat. No. 2,909,258 to Kotz, inductive charges opposite in polarity to a latent image induced on an electrically conductive sleeve are delivered to the ends of electrically conductive magnetic toner, and therefore it is considered that the force of sticking toner onto the photo-sensitive material is caused by the coulomb force of the aforementioned charges and the latent image charges. Furthermore, according to U.S. Pat. No. 4,121,931 to Nelson, the toner sticking force is caused by the coulomb force of the charge of insulative magnetic toner which is opposite in polarity to a latent image which is forcibly charged by electrodes, and the latent image charges. As well known in the art, a coulomb force F is expressed by the following equation: $F = q E$, where q is the charge of a toner, and E is the electric field of that point. If the toner sticking force is caused only by the force F, then it can be observed as a current which flows between an external electrode or an electrically conductive sleeve and the photo-sensitive material. The value of the current should be proportional to the amount of stuck toner. However, it is impossible to explain the mechanism of development by a semiconductive or insulative magnetic toner based only on the aforementioned concept. The mechanism is further affected by physical sticking forces such as polarization force and van der Waals' force or other various factors. It has been confirmed through the following experiments that there are many areas which cannot be explained by the concept that, as disclosed by Nelson, development is effected by charging a high resistance toner before the development and carrying it to the surface of a latent image.

In the experiments, a stainless steel sleeve 32 mm in diameter was used, and a Se drum 210 mm in outside diameter having a surface potential of 800 V in its area 60 mm in width and 150 mm in circumferential length was employed as a latent image on a photo-sensitive material. The peripheral velocity of the photosensitive material was set to 60 mm/sec, and the development gap was set to 0.5 mm. A magnetic toner having a volumetric resistivity $10^{10} \Omega cm$ under an electric field of DC 4000 V/cm was used. The magnet employed had a magnetic force of 650 gauss on the sleeve. One of the eight symmetrically arranged magnetic poles of the magnet was fixedly secured so that it confronted the Se drum. A development current was measured which flowed between the rear surface of the photo-sensitive material and the electrically conductive sleeve when, under the condition that the sleeve was moved in the same direction as that of the Se drum in the development section, the number of revolutions per minute of the sleeve was changed. The experimental results are as indicated in FIG. 8.

Figure 8:
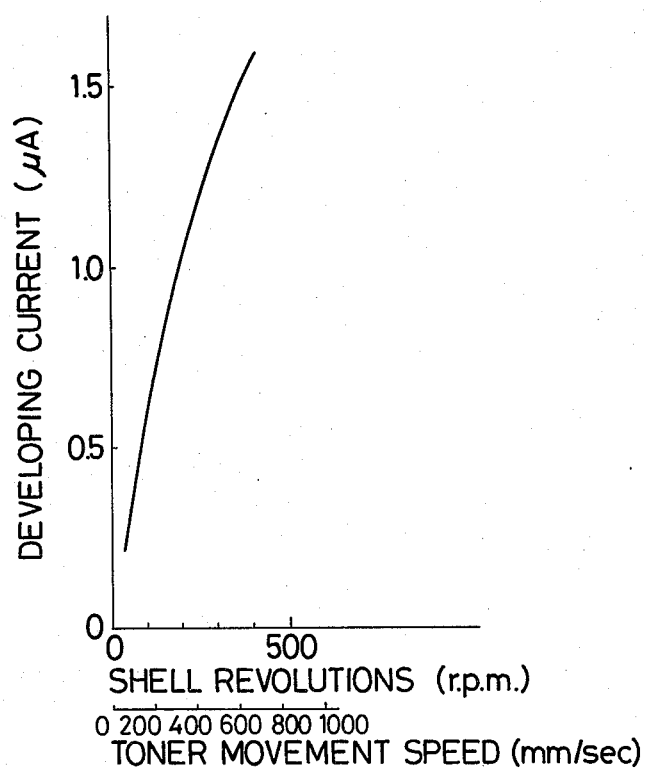
FIG. 8 is a graphical representation indicating the relation between toner movement speed and a developing current in a conventional sleeve rotation system.

As shown in FIG. 8, the developing current is increased in proportion to the number of revolutions per minute of the sleeve. When the r.p.m. of the sleeve is 100, only a current of the order of 0.6 $\mu A$ flows. However, when the r.p.m. of the sleeve is increased to 400, then a current of 16 $\mu A$ flows. Thus, it is confirmed that the relations between the r.p.m. of the sleeve, or the toner movement speed, and the developing current are as disclosed by Nelson.

Figure 9:
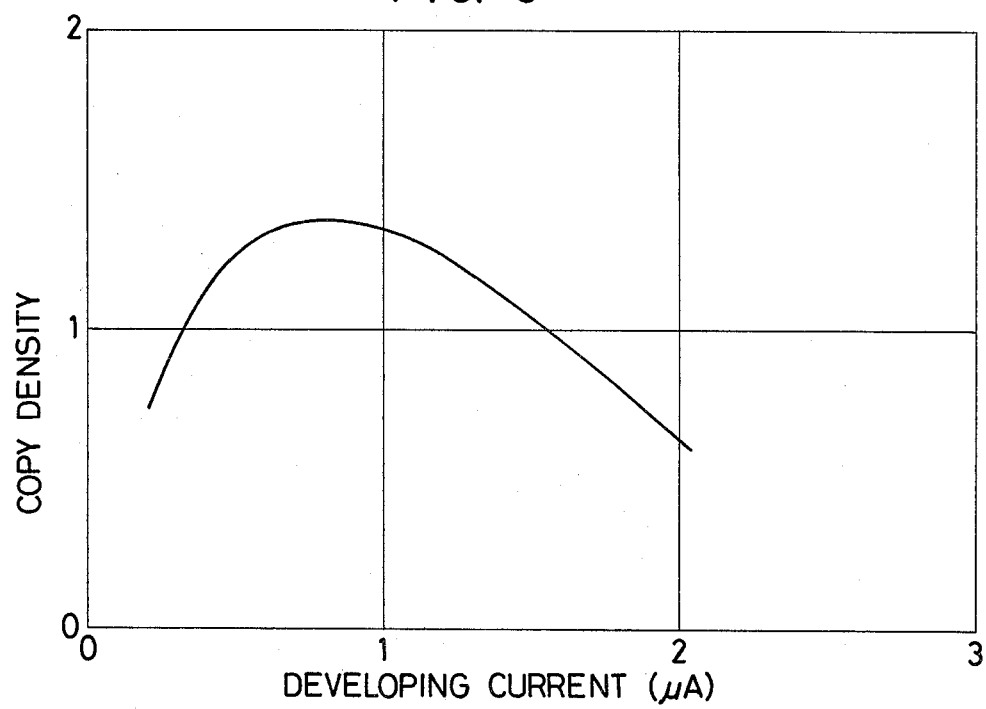
FIG. 9 is a graphical representation indicating the relation between developing current and copy density in the conventional sleeve rotation system.

However, the relationships between the developing current and the copying density were not always coincident with the results described in Nelson. Shown in FIG. 9 are the relations between the developing current and the copy density which were obtained under the same conditions as those in FIG. 8. According to the graphical representation in FIG. 9, when the developing current is about 0.8 $\mu A$, the copy density is a maximum, and thereafter even if the developing current is increased, the copy density is abruptly decreased.

The results indicated in FIG. 9 clearly indicate the drawback accompanying the sleeve rotation system. That is, it is apparent that when the sleeve is rotated at high speed, then the amount of stuck toner increases tending to eliminate latent image charge and an effect of cleaning the magnetic brush. The toner is brought into contact with the toner brush after development, to be recovered. In other words, in the sleeve rotation system, apparently the developing current flows, but it does not completely contribute to the sticking of the toner, i.e., development. It has been confirmed that, the above-described results have a similar tendency although the current value and the copy density are more or less varied according to the development magnetic pole position and the development gap.

Figure 10:
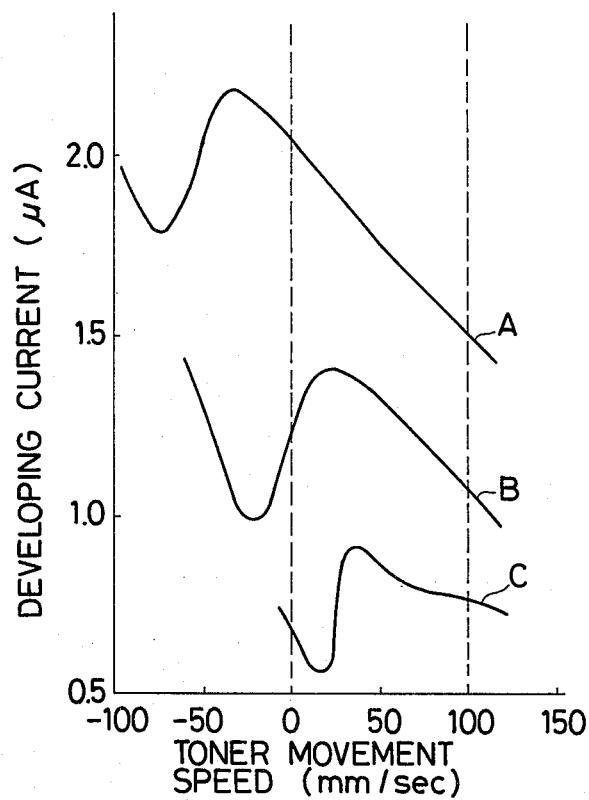
FIG. 10 is a graphical representation indicating the relation between toner movement speed and developing current in a system of rotating both a sleeve and a magnet roll according to the invention.

As is apparent from the above description, if the toner movement speed $V_t$ is excessively high, then it will interrupt the development, and it is difficult to find the best developing conditions. Therefore, with conditions of latent image and development set similar to those in the sleeve rotation system described above, the toner movement speed $V_t$ in the system according to the invention in which the sleeve and the magnet are rotated was obtained from the equation (1) and by actual measurement to obtain the relations between the toner movement speed $V_t$ and the developing current. The results are as indicated in FIG. 10, in which the curves A, B and C indicate the results obtained respectively when the r.p.m. of the magnet is set to 1200, 800, and 400. As is clear from FIG. 10, the increase of the developing current is not always simply proportional to the increase of the toner movement speed $V_t$. That is, the developing current is intricately varied as the toner movement speed is increased. It reaches the maximum value when $|V_t|$ is less than 100 mm/sec. In FIG. 10, in the case when the value $V_t$ is negative, it is indicated that the toner moves in a direction opposite to the direction of rotation of the sleeve and the magnet and to the direction of movement of the photo-sensitive material drum. As indicated in Table 1, this method is not practical because the resultant image includes fog.

Figure 11:
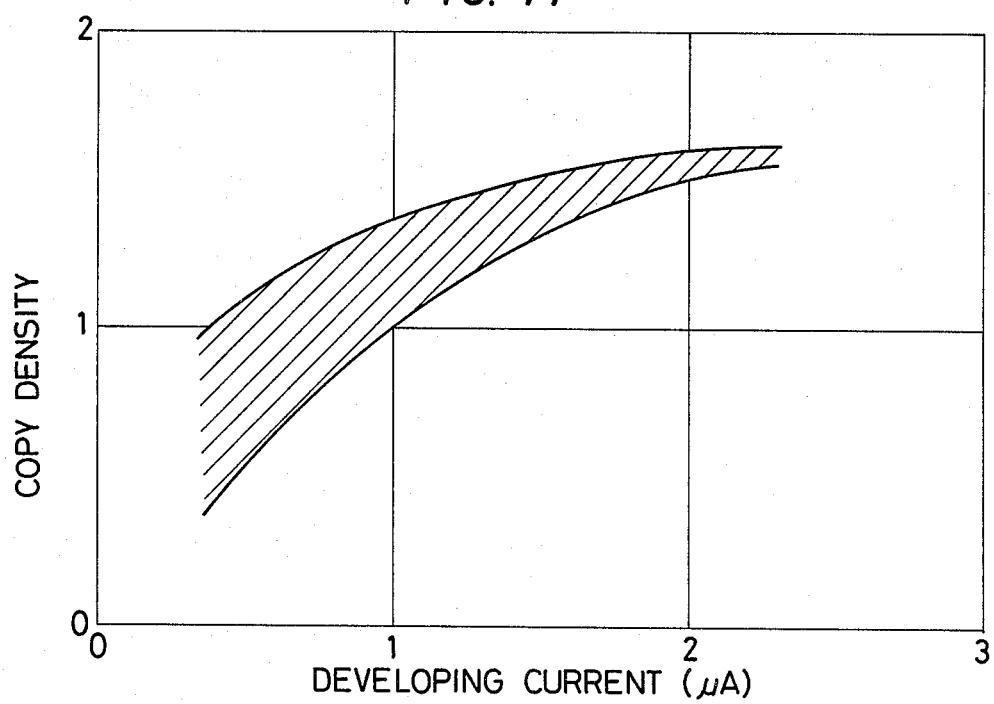
FIG. 11 is a graphical representation indicating the relation between developing current and copy density in the system according to the invention.

The relationships between the developing current and the finally obtained copy density in the system of rotating both of the sleeve and the magnet are as indicated in FIG. 11. Thus, it has been found that the developing current is in proportion to the copy density. The results indicated in FIG. 11 were obtained under the same conditions as those in the case of FIG. 10.

Figure 12:
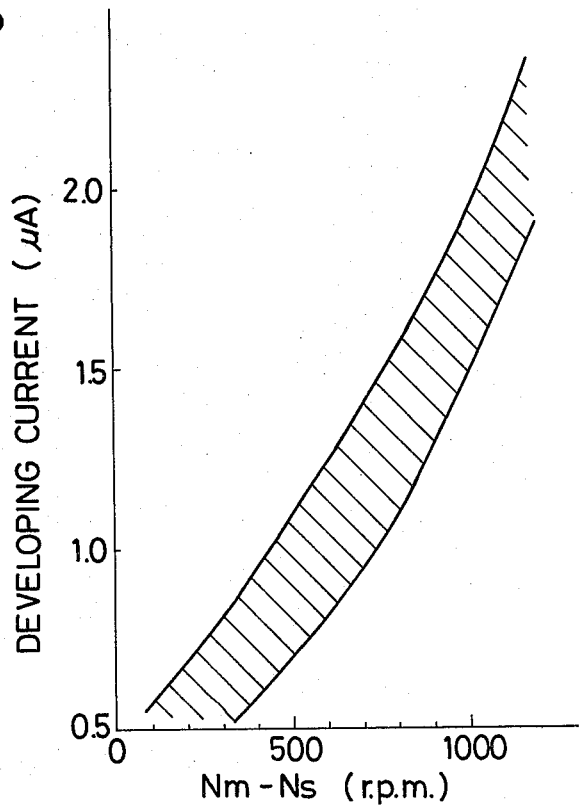
FIG. 12 is a graphical representation indicating the relation between the number of relative revolutions of a magnet roll and a sleeve and the developing current.

The relationships between the rotation cycle, $N_M-N_S$, of the toner and the developing current in the system of rotating both of the sleeve and magnet were obtained under the same conditions as those in the case of FIG. 11. The results are as indicated in FIG. 12. Thus, it is apparent that the mutual relationship between the rotation cycle of the toner and the developing current is higher than that between the toner movement speed and the developing current. As clear from FIG. 12, the greater the r.p.m. of the magnet, the larger the developing current. However, if the number of revolutions per minute of the magnet is large, as shown in FIG. 10 the developing current has its peak value on the negative (plus) side with respect to the toner movement speed, and on the positive (plus) side the developing current is sometimes decreased with the increase of the toner movement speed.

Figure 13:
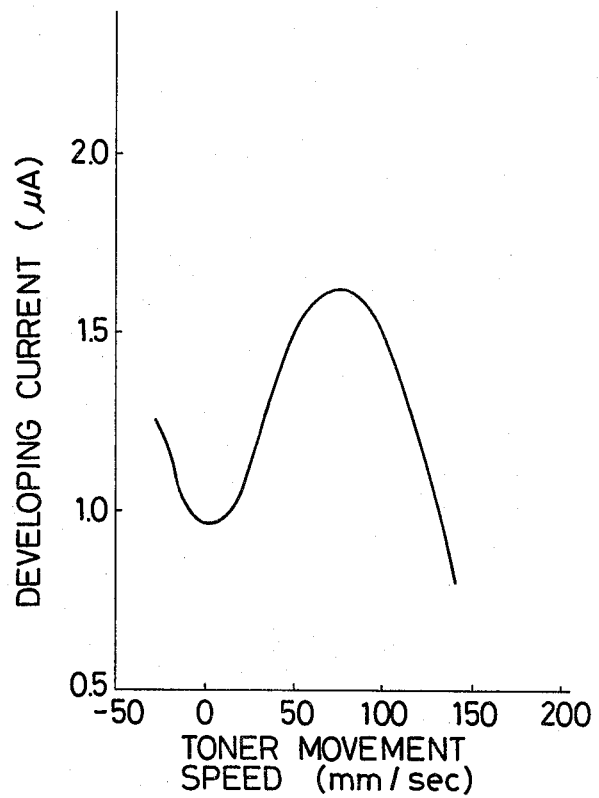
FIG. 13 is a graphical representation indicating toner movement speed and developing current for a description of a second example of the developing method according to the invention.

FIG. 13 indicates the relationships between the toner carrying speed and the developing current in a different practical toner carrying method indicated in Table 1, i.e., in a system of moving the sleeve and the magnet in a direction opposite to the direction of movement of the photo-sensitive material at the developing position. The results indicated in FIG. 13 have been obtained under the same conditions as those in the above-described case except for the 1200 r.p.m. of the magnet.

If, according to this toner conveyance method, the sleeve and the magnet are rotated in a direction opposite to the direction of movement of the photo-sensitive material to carry the toner in the same direction as the direction of movement of the photo-sensitive material, then the developing current is increased before the toner movement speed becomes approximately 60-70 mm/sec. However, therafter, the developing current is decreased with the increase of the toner movement speed, and it is abruptly decreased when the toner movement speed extends 100 mm/sec. When the toner movement speed approaches zero (0), the developing current has a minimum value. Thus, it is essential for this developing method that the toner movement speed be within the range of from 0 to 100 mm/sec.

The difference between the sleeve rotation system and the sleeve and magnet rotation system can be summarized from the above description as follows:

In the sleeve rotation system, as in apparent from FIGS. 8 and 9, the developing current providing the maximum density is allowed to flow when the toner movement speed is, for example, about 250 mm/sec and a copy density of about 1.3 is obtained when the developing current is of the order of 0.8 $\mu$A.

On the other hand, as is clear from FIGS. 10 and 11, although the rate of revolutions per minute of the magnet and the sleeve are set to 1200 r.p.m. and 110 r.p.m., respectively, and the toner movement speed is set to 18 mm/sec, the developing current reaches as high as 2 $\mu$A, and finally a high copy density 1.6 can be obtained.

Taking the above-described experimental facts into consideration, the difference in development characteristic between the system according to the invention and the sleeve rotation system as disclosed by the specification Nelson is as follows:

In the case where development is effected with a semiconducting or insulating high resistance magnetic toner, it cannot be considered that, as described in the specifications of Katz and Nelson, an electrostatic attraction force is caused in the toner only by the coulomb force of the charges induced by the electric field of the latent image or the charges of the toner which are applied by the electrodes, and the latent image charges whereby the development is performed by the sticking of the toner. That is, it is considered that it is necessary to take into account a polarization force caused by the minute non-uniform electric field of the latent image for the development. This assertion is proved by the following facts. If it is assumed that the development can be achieved only by induction or charging, with a low resistance toner, or an electrically conductive toner, the charges are discharged immediately, so that the toner sticking power of the latent image is also immediately eliminated. However, in practice, the latent image can relatively strongly attract the toner; that is, the toner is strongly held on the photo-sensitive material. The fact the charges of the latent image are not completely discharged, that is, they are maintained held even after the development, is clear from the fact that the surface potential exists although decreased, after development.

In the case where the development is performed with a high resistance magnetic toner, whether the polarity is the same or opposite, the struck toner can be transferred. Therefore, it can be understood that it is necessary to take into consideration not only the simple residual charge of the toner but also the polarization force induced by the transferring electric field. With a ZnO photo-sensitive material in which the minute surface potential distribution is liable to be nonuniform, development can be achieved to an extent merely by spreading the high resistance toner over the photo-sensitive material.

If the development can be effected as described in the specifications of Katz and Nelson, the developing current should be proportional to the density. However, as described, it is difficult to explain using only this logic, that is, it is considered that the development is effected by the intricate combination of various factors such as polarization, and leakage of charges from the photo-sensitive material.

Furthermore, the following fact must be taken into consideration. When development is performed by using an insulating sleeve and a semi-conducting or insulating toner, the copy density is decreased as the number of copies and the developing time are increased. As a result, the resultant image has problems with fog. In this case, the polarity of the charges of the stuck toner is equal to that of the charging characteristic of the photo-sensitive material, and this amount of charge is increased with the number of copies. This is considered to a principle explanation for the problem. In another respect, even with the insulating toner, charges opposite in polarity to the latent image are induced in the toner near the latent image through induction by the electric field of the latent image. As a reaction, the charges equal in polarity to the latent image are moved to the insulating sleeve; that is, apparently the charges of the latent image are received by the toner and are accumulated in the toner on the sleeve.

Accordingly, in order to continuously perform satisfactory development, it is necessary to eliminate the charges thus accumulated. Thus, in the present invention, it is important to eliminate the accumulated charges by using suitable means, such as application of corona ions to the sleeve, electrodes for removing charges, and a sleeve having an electrically conductive part which is grounded. However, for a developing device in which the body such as a toner hopper is made of metal such as aluminum or plastic such as "Derlin", it is unnecessary to positively ground it in order to permit the flow of a leak current of several microamperes. If it is required to neutralize the charges equal in polarity to the latent image and accumulated on the sleeve, the requirement can be satisfied by disposing a charge neutralizing electrode or AC coronas at a predetermined position between the development completion position and the supply means such as a toner hopper.

Figure 14:
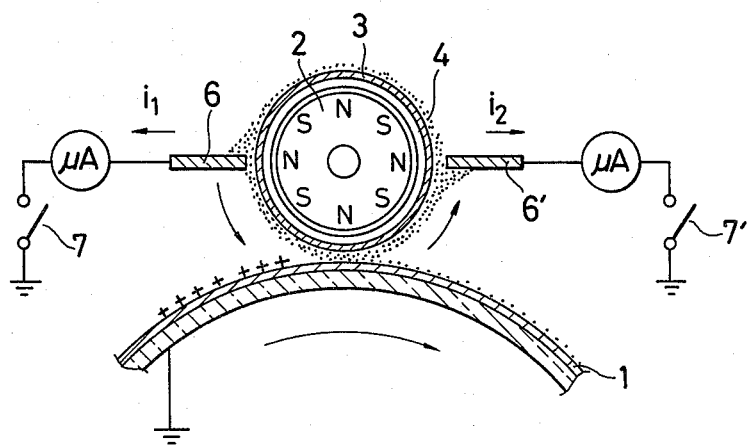
FIG. 14 is a sectional view showing a device for measuring the developing current.

It is apparent from the above-described experiments that as the motion of rotation of the toner chain is greatly affected by the alternating magnetic field due to the rotation of the magnet rather than the effect of the toner movement speed. Also, the charge leak speed facilitates the movement of the charges which has been induced towards the sleeve by the electric field of the latent image. This has been demonstrated to be correct by the results of the following measurement. As shown in FIG. 14, grounded electrodes 6 and 6' are disposed before and behind the developing stage in such a manner as to be in contact with a toner. While a magnet 2 is set stationary, an insulating sleeve 3 is rotated to carry the toner in the direction of the arrow. The current which flows when the toner thus carried develops a latent image on a photo-sensitive material moved in the direction of the arrow is measured.

In the case where an electrically conductive toner having a volumetric resistivity of the order of $10^3$ Ωcm under an electric field of DC 4000 V/cm is used, no difference is observed between the current $i_1$ in the electrode 6 and the current $i_2$ in the electrode 6'. However, in the use of a semi-conducting or insulating toner having a volumetric resistivity of $10^7$ Ωcm or higher under an electric field of DC 4000 V/cm, the current $i_2$ is larger than the current $i_1$.

As one examle of these experimental results, the currents $i_1$ and $i_2$ measured under the following conditions are listed in Tables 6, 7 and 8. Toners having a volumetric resistivity $10^7$, $10^{10}$ and $10^{15}$ Ωcm under an electric field of DC 4000 V/cm are used, and the surface potential of Se photo-sensitive material is set to +800 V. Furthermore, a cylindrical sleeve 32 mm in outside diameter the outer wall is covered with "Mylar" 50μ in thickness is used. A magnet having eight symmetrically arranged magnetic poles and a magnetic force of 600 gauss on the sleeve is employed. The development gap is set to 0.5 mm, and the gap between the electrodes 6 and 6' and the sleeve 3 is set to 0.4 mm.

TABLE 6

| | Measurement Conditions | | | Resistivity of toner (Ωcm) Toner Movement speed (mm/sec) | |
|---|---|---|---|---|---|
| | | | 250 | 450 | 670 |
| $i_1$ | A (μA) | Switch 7 on | Switch 7' off | 0.76 | 1.10 | 1.40 |
| | A (μA) | Switch 7 on | Switch 7' on | 0.30 | 0.48 | 0.75 |
| | B/A | | | 0.39 | 0.44 | 0.54 |
| $i_2$ | A (μA) | Switch 7' on | Switch 7 off | 0.80 | 1.10 | 1.42 |
| | A | Switch 7' on | Switch 7 on | 0.60 | 0.80 | 1.08 |
| | B/A | | | 0.75 | 0.73 | 0.76 |

TABLE 7

| | Movement Conditions | | | Resistivity of Toner (Ω cm) $10^{10}$ Toner Movement Speed (mm/sec) | |
|---|---|---|---|---|---|
| | | | 250 | 450 | 670 |
| $i_1$ | A (μA) | Switch 7 on | Switch 7' off | 0.47 | 0.74 | 0.88 |
| | A (μA) | Switch 7 on | Switch 7' on | 0.19 | 0.29 | 0.35 |
| | A/B | | | 0.40 | 0.39 | 0.40 |
| $i_2$ | A (μA) | Switch 7' on | Switch 7 off | 0.50 | 0.82 | 1.05 |
| | A (μA) | Switch 7' on | Switch 7 on | 0.41 | 0.72 | 0.93 |
| | B/A | | | 0.82 | 0.88 | 0.89 |

TABLE 8

| | Movement Conditions | | Resistivity of toner ($\Omega$ cm) $10^7$ | | |
|---|---|---|---|---|---|
| | | | Toner Movement Speed (mm/sec) | | |
| | | | 250 | 450 | 670 |
| $i_1$ | A ($\mu$A) | Switch 7 on | Switch 7' off | 0.10 | 0.25 | 0.34 |
| | A ($\mu$A) | Switch 7 on | Switch 7' on | 0.04 | 0.12 | 0.18 |
| | B/A | | | 0.40 | 0.48 | 0.53 |
| $i_2$ | A ($\mu$A) | Switch 7' on | Switch 7 off | 0.10 | 0.26 | 0.38 |
| | A ($\mu$A) | Switch 7' on | Switch 7 on | 0.10 | 0.20 | 0.28 |
| | B/A | | | 1.00 | 0.78 | 0.74 |

Table 6 indicates the results of measurement of the current $i_1$ in the electrode 6 disposed before the development stage. In this case, the switch 7 is maintained closed, while the switch 7' is selectively turned on and off, and the r.p.m. of the sleeve is changed three times. Thus, the current is measured under six different conditions. Table 6 indicates also the results of measurement of the current $i_2$ under six different conditions.

As indicated in Table 6, when the toner movement speed is 450 mm/sec and the switch 7' is turned off, a current of 1.10 $\mu$A flows in the electrode 6. However, when the switch 7' is turned on, a current of 0.48 $\mu$A flows in the electrode 6. On the other hand, with the 450 mm/sec of the toner movement speed, when the switch 7 is turned off, a current of 1.10 $\mu$A flows in the electrode 6', when switch 7 is turned on, a current of 0.80 $\mu$A flows in the electrode 6'. This tendency is still observed in the case where the toner movement speed is set to 250 mm/sec and 470 mm/sec.

Accordingly, it can be confirmed from the above-described experimental results that the current in the electrode disposed behind the development stage is larger than the current in the electrode disposed before the development stage. Furthermore, as seen in Tables 6 through 8, the difference between the current in the electrode behind the development stage and the current in the electrode before the development stage is increased as the resistance of the toner is increased.

Thus, it is apparent from these facts that the developing system according to the invention is essentially different from the developing system described in Nelson in which a high resistance insulating magnetic toner is charged before development whereby a force of sticking the toner onto the charges of a latent image is produced.

Figure 15:
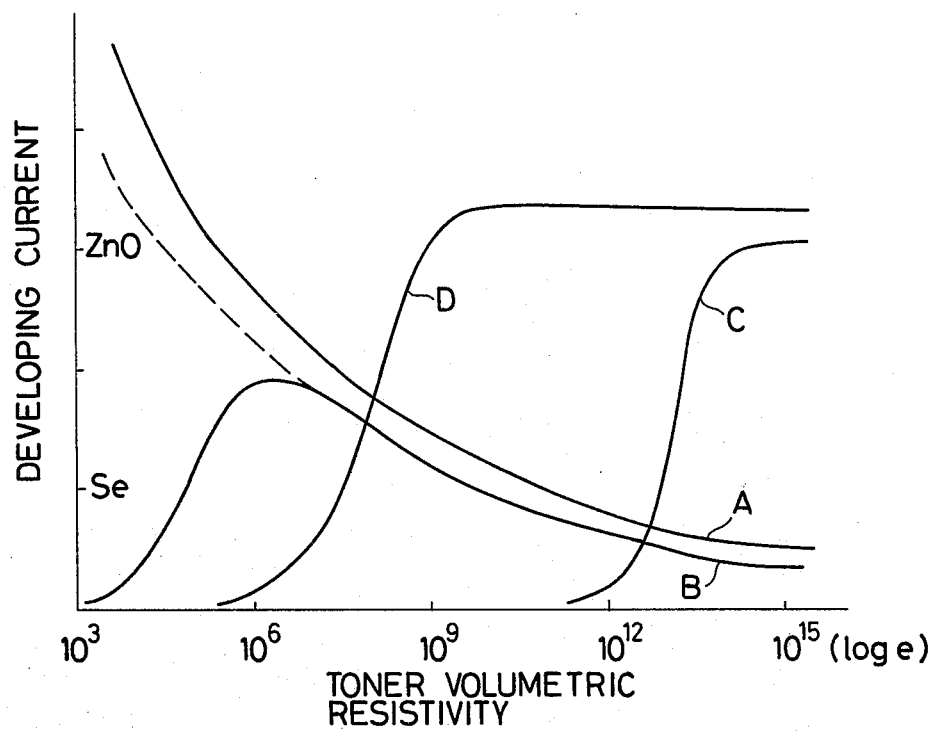
FIG. 15 is a graphical representation indicating the relation between the volumetric resistivity of a toner and developing current together with a transferring efficiency.

The relation between the developing current and the toner's volumetric resistivity, which can be employed as a reference in evaluating the development characteristic of the developing method according to the invention in which both of the sleeve and the magnet are rotated, is as indicated by the curve A in FIG. 15, if the various experimental results are summarized. Volumetric resistivity of the toner in FIG. 15 are at an applied field of 4000 V/cm D.C.

The practical development characteristic, i.e., the amount of toner stuck to the development section is decreased with the decrease of the developing current if the toner's volumetric resistivity is excessively high. In contrast the amount of toner stuck thereto is abruptly increased if the toner's volumetric resistivity is changed to be low. For instance, in the case of a Se photo-sensitive material which is low in charge holding characteristic, when the toner's volumetric resistivity is decreased to about $10^6$ $\Omega$cm, then the charge of the latent image is removed at the time of development and the developing current is increased. However, the amount of toner stuck thereto is abruptly decreased as indicated by the solid line part of the curve B in FIG. 15. In the case of a ZnO photo-sensitive material, being high in charge holding characteristic, the toner sticking amount is increased as the toner's volumetric resistivity is decreased and correspondingly as the developing current is increased. This is indicated by the broken line part of the curve B in FIG. 15.

As apparent from FIG. 15, in the case of a semiconducting or insulating toner, the developing current and development characteristic thereof are decreased as the resistance of the toner is increased. However, according to the method of the present invention, this drawback can be markedly eliminated. A satisfactory copy cannot be obtained without satisfactory transferring and fixing after the development. Accordingly, the inventors have concluded a detailed investigation as follows: First, it is essential that the semiconducting or insulating toner employed in the invention has a volumetric resistivity of $10^8$ to $10^{16}$ $\Omega$cm under an electric field of DC 400 V/cm. The electrical resistance of the toner greatly affects not only the development characteristic but also the transferring characteristic. At the time of development, a magnetic attraction force and an electrostatic attraction force acting in a direction opposite to the direction of the magnetic attraction force act on the toner. Among these forces, the magnetic attraction force is determined from both the content of magnetic powder in the toner and the magnetic attraction force of the magnet.

For an ordinary toner, 40 to 80% by weight the magnetic powder. The toner's volumetric resistivity can be changed to approximately $10^3$ to $10^{15}$ $\Omega$cm by adding electrically conductive particles such as carbon black powder to the toner. Accordingly, out of the toners thus prepared, a toner having a predetermined characteristic can be selected.

It is known that a toner may be modified into one for pressure fixing or thermal fixing. In general, the grain size distribution of a toner is in a range of 5 to 50$\mu$, preferably in a range of 10 to 25$\mu$.

When, in the case where a toner image formed on a photo-sensitive material is transferred according to various developing methods using various toners different in electrical resistance, a transferring sheet for an ordinary two-component system copying machine is used, then with a toner having an electrical resistance of less than about $10^{13}$ $\Omega$cm the transferring efficiency is decreased as indicated by the curve C in FIG. 15. Furthermore the transferred image becomes unclear because of the electrical conductivity of the toner particles and the leakage of the charges on the rear surface of the transferring sheet to the transferring surface. In order to find the reason for this, the relationship between the various characteristics of the sheet and the transferring characteristic of the toner has been studied.

Figure 16:
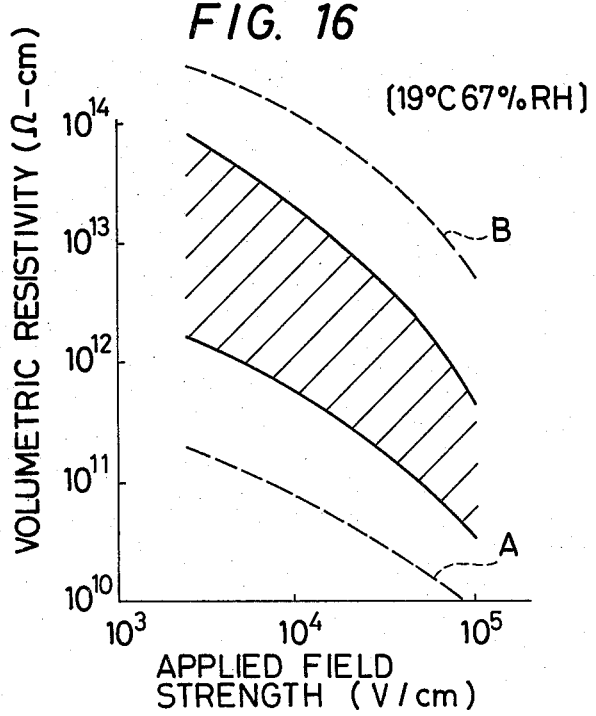
FIG. 16 is a graphical representation indicating the relation between the strength of an electric field applied and the volumetric resistivity of a transferring sheet.
Figure 17:
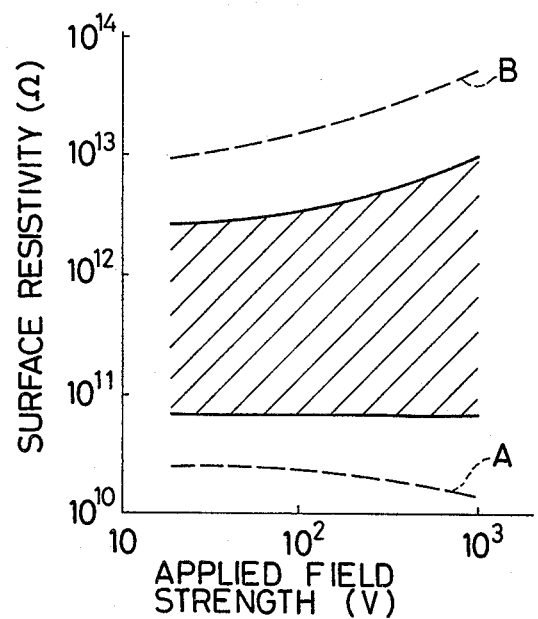
FIG. 17 is a graphical representation indicating the relation between the strength of an electric field applied and the surface resistance of a transferring sheet.

First, the volumetric resistivity and surface resistance of a conventional sheet and those of a trasferring sheet employed in the invention have been measured with a dynamic condenser type microammeter (No. Tr-84 M) manufactured by the Takeda Riken Co., under the condition of 19° C. and 60% RH. The results of the measurement are as indicated in FIGS. 16 and 17. That is, some of the conventional sheets are as indicated by the curves A and B in FIG. 16 and the curves A and B in FIG. 17. The sheets indicated by the curves A in FIGS. 16 and 17 are low in resistance and therefore even if a high resistance toner having a volumetric resistivity of the order of $10^{15}$ Ωcm is used, the resultant transferring is unsatisfactory because of the leakage of the transferring electric field and especially in the case where the transferring is effected at a high humidity. With the high resistance sheets indicated by the curves B in FIGS. 16 and 17, it is difficult to peel the sheet off the photo-sensitive material after development, and the sheets are excessively high in charge holding characteristic. Accordingly, the toner image is liable to be deformed at the time of peeling the sheet off the photo-sensitive material. The sheets require a special surface treatment or the like according to a special method. Thus, these sheets cannot put into practical use.

Most of the resistance characteristics of the sheets which are used for an ordinary transferring type copying machine employing a two-component system charging toner are in ranges defined by the oblique lines in FIGS. 16 and 17. However, even the sheets which show substantially equivalent electrical resistances in the range defined by the oblique lines are significantly different in transferring characteristic from one another. Thus, it has been found that the transferring characteristic of a high resistance toner is greatly affected by other factors.

Figure 18:
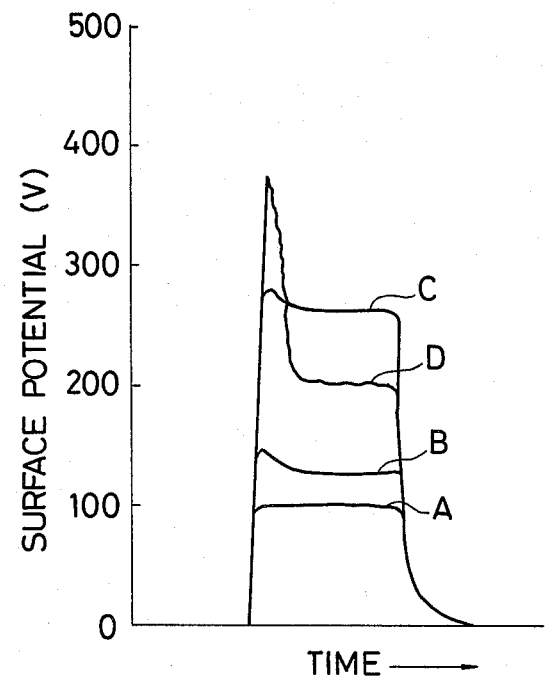
FIG. 18 is a graphical representation indicating the charging characteristics of a transferring sheet.

The inventors have found that the cause resides in the charging characteristic of the sheet, the degree of smoothness and the gas-permeability of the sheet. Indicated in FIG. 18 are the results of the measurement of the dynamic charging characteristics of various sheets which were carried out under the application of −7 KV with an electrostatic charging tester (SP 428) manufactured by the Kawaguchi Denki Co. In the case of conventional sheets, as indicated by the curves A and B in FIG. 18, most have a saturation surface potential less than 150 V and are poor in transferring characteristic.

On the other hand, the sheets indicated by the curves C and D in FIG. 18 have a high saturation surface potential, 200 to 350 V and are excellent in transferring characteristic. Among these sheets, a sheet in which, as indicated by the curve D, its initial surface potential is high, and thereafter the potential is abruptly decreased and finally set to a predetermined saturation potential, is especially excellent in transferring characteristic. A satisfactory transferring operation can be effected with the toner's volumetric resistance of from approximately $10^8$ Ωcm. Transferring the toner image from the photo-sensitive material is carried out by effecting corona discharge from behind the transferring member or by bringing the rear ssurface of the transferring member into contact with a conductive rubber roller.

In order to prevent the leakage of the charges applied to the transferring sheet to the toner sticking surface, it is essential that in addition to the volumetric resistivity and surface resistance of the sheet, the surface charge holding characteristic is as indicated by the curves C or D, especially the curve D, in FIG. 18. The curves in FIG 18 are for typical ones out of the various sheets measured. It has been found that if, in the case where the saturation potential is higher than 150 V, the following conditions of gas-permeability and smoothness are satisfied before the voltage reaches approximately 1000 V, a satisfactory transferring result is obtained.

In order to confirm the above-described characteristics required for a transferring sheet, the smoothness and gas-permeability of each sheet have been measured by the use of a densometer (No. 158d) and a Bekk smoothness tester manufactured by the Toyo Seiki Seisakusho. The measurement results are as indicated in Table 8 below:

TABLE 9

| Kind of Sheet | Gas-Permeability (sec.) | Smoothness (sec.) |
|---|---|---|
| A | 10 | 15 |
| B | 18 | 20 |
| C | 34 | 28 |
| D | 350 | 70 |

As apparent from the data indicated in Table 8, it has been confirmed that ions or electrons generated by a transferring charger provided behind the transferring member pass through the transferring sheet as the gas-permeability and smoothness thereof are decreased.

In addition to the above-described four different sheets, various transferring sheets have been investigated for gas-permeability and smoothness. As a result, it has been found that it is preferable to use a transferring sheet having a gas permeabilityy of 25–800 sec., a smoothness of 20–100 sec., a saturation potential of 150–1000 V at 20° C. and 60% RH at the time of approximately −7 KV dynamic corona charging, a volumetric resistivity of $10^{11}$–$10^{14}$ Ωcm, and a surface resistance of $10^{10}$–$10^{14}$ Ω. Among the above-described various characteristics, it is more preferable that the charging characteristic is such that the saturation potential has its peak value in a range of 200 to 700 V and thereafter reaches a value of 150 to 300 V in a very short time.

From the above description it is apparent that in order to electrostatically transfer the powder image, on the photo-sensitive material, of the semiconducting or insulating magnetic toner, it is necessary to use the transferring sheet which meets all of the electrical resistance characteristic, charging characteristic; charging characteristic; smoothness and gas-permeability described above. If the transferring sheet satisfying all of the above-described characteristic requirements, such as a transferring sheet indicated by "D" in Table 8 and FIG. 18, is used, high transferring efficiency can be obtained even if the toner's volumetric resistance is low or of the order of $10^8$ Ω is indicated by the curve D in FIG. 15. Furthermore, the use of this transferring sheet results in an excellent transferring operation even at about 80% PH.

As described in detail, a clear copy can be obtained by the following method: The magnet and the sleeve are rotated in the same direction to move the magnetic toner whose volumetric resistivity is from $10^8$ Ωcm to $10^{16}$ Ωcm under an electric field of DC 4000 V/cm, whereby an electrostatic latent image on the photo-sensitive material is developed and is then transferred onto the transferring sheet satisfying the abovedescribed characteristic requirements, and thereafter it is subjected to thermal fixing or pressure fixing.

The electrophotography according to the invention has been described with reference to the ordinary transferring type copying machine; however, it should be noted that the invention is not limited thereto or thereby. That is, the technical concept of the invention can be applied to a variety of recording devices such as printers and facsimiles in which a transferring process is effected; that is, an electrostatic latent image on an insulating or photo-sensitive material is developed and is then transferred for copying or recording.

The invention has been described with reference to the case in which the cylindrical non-magnetic sleeve and the permanent magnet roll rotatably arranged in the cylindrical non-magnetic sleeve are employed as the toner carrying means; however, an electromagnet instead of the permanent magnet roll may be employed as the magnetic field generating means, or both the electromagnet and the permanent magnet roll may be employed. It goes without saying that the same effect can be obtained by the combination of the belt-shaped non-magnetic carrier and the above-described magnetic field generating means whose alternating magnetic fields (N and S) are moved in the same direction as that of the belt-shaped non-magnetic carrier.

EXAMPLE 1

An electrostatic latent image having a surface potential of +800 V was developed by using a Se drum 120 mm in outside diameter as a photo-sensitive material, a magnetic toner having a volumetric resistivity $10^{12}$ $\Omega$cm, and the developing device shown in FIG. 2.

The peripheral velocity of the Se drum was set to 60 mm/sec. In the developing device, a stainless steel sleeve 32 mm in outside diameter was rotated at 100 r.p.m., and a magnet roll made up of ten symmetrically arranged magnetic poles and having a magnetic force of 550 gauss on the surface of the sleeve was rotated at 1000 r.p.m. The development gap and the doctor gap were set to 0.5 mm and 0.8 mm, respectively. The directions of rotation of the sleeve and the magnet roll were the same as that of the Se drum at the development section. The toner movement speed was about 30 mm/sec according to the above-described equation (1).

A toner image formed on the Se drum was transferred onto a transferring sheet by corona discharge, and then the sheet was subjected to pressure fixing to obtain a copy image. The sheet has a volumetric resistivity of $10^{13}$ $\Omega$cm under an electric field of 1000 V/cm, a surface resistance of $10^{11}$ $\Omega$ at 100 V, a gas-permeability of 390 sec., a smoothness of 70 sec., and charging characteristics similar to those indicated by the curve D in FIG. 18. The sheet further has an initial surface potential of 350 V and a saturation potential of 205 V.

Under the above-described copying conditions, an excellent copy image could be obtained which was satisfactory in development characteristic, transferring characteristic and image density, and had no fog.

EXAMPLE 2

A latent image having a surface potential of +750 V was developed by using a Se drum 210 mm, outside diameter, as a photo-sensitive material, magnetic toner having a volumetric resistivity under an electric field of 4000 V/cm, and the developing device as shown in FIG. 2. The peripheral velocity of the Se drum was set to 200 mm/sec. In the developing device, a sleeve similar to that in Example 1 was rotated at 150 r.p.m., and a magnet roll made up of ten symmetrically arranged magnetic poles and having 650 gauss on the surface of the sleeve was rotated at 1400 r.p.m. The development gap and the doctor gap were set to 0.6 mm and 0.3 mm, respectively. The directions of rotation of the Se drum, the sleeve and the magnet roll were the same as those in Example 1. The toner movement speed was about 61.2, which was obtained as in Example 1.

A toner image formed on the Se drum was transferred onto a transferring sheet similar to that in Example 1 by corona discharge, and the sheet was subjected to pressure fixing. As a result, an excellent copy could be obtained which was excellent in developing characteristic and transferring characteristic, sufficient in density, and had no fog.

EXAMPLE 3

A latent image having a surface potential of +900 V was developed by using a photo-sensitive material similar to that in Example 2, a magnetic toner having a volumetric resistivity of $10^{15}$ $\Omega$cm under an electric field of 4000 V/cm, and a developing device similar to that in Example 2. The peripheral velocity of the Se drum was 100 mm/sec.

The sleeve and the magnet were similar to those in Example 2, and were rotated in the same directions and at the same r.p.m.s as those in Example 2. The development gap and the doctor gap were set to 0.2 mm and 0.4 mm, respectively.

A toner image formed on the Se drum was transferred onto a transferring sheet by corona discharge, and the sheet was subjected to thermal fixing in a oven. As a result, an excellent copy could be obtained which was superior in development characteristic and transferring characteristic, sufficient in density, and had no fog. The transferring sheet used had a volumetric resistivity of $5 \times 10^{11}$ $\Omega$cm under an electric field of 10,000 V/cm, a surface resistance of $1 \times 10^{11}$ $\Omega$ at 1000 V, a gas-permeability of 25 sec., a smoothness of 20 sec., charging characteristics as indicated by the curve C in FIG. 18, and a saturation potential of 160 V.

EXAMPLE 4

An electrostatic latent image was developed by using a photo-sensitive material 160 mm in outside diameter which was obtained by covering CdS with "Mylar", a magnetic toner having a volumetric resistivity of $10^{10}$ $\Omega$cm under an electric field of 4000 V/cm, and a developing device similar to that in Example 1. The peripheral velocity of the photo-sensitive material was set to 86 mm/sec. A sleeve similar to that in Example 1 was rotated at 90 r.p.m., which a magnet roll made up of twelve symmetrically arranges magnetic poles and having a magnetic force of 550 gauss on the surface of the sleeve was rotated at 800 r.p.m. The development gap and the doctor gap were set to 0.4 mm. The directions of rotation of the photo-sensitive material, the sleeve and the magnet roll were the same as those in Example 1. The toner movement speed was about 43 mm/sec.

A toner image formed on the photo-sensitive material was transferred onto a transferring sheet by corona discharge, and the sheet was subjected to pressure fixing. As a result, an excellent copy was obtained which was excellent in both development and transferring characteristics, sufficient in density and had no fog.

The transferring sheet used had a volumetric resistivity of $10^{12}$ $\Omega$cm under an electric field of 10,000 V/cm, a surface resistance of $8 \times 10^{10}$ $\Omega$ at 100 V, a gas-permeability of 102 sec., a smoothness of 40 sec., a charging characteristic curve similar to the curve C in FIG. 18, and a saturation potential of 190 V.

EXAMPLE 5

An electrostatic latent image having a surface potential of −450 V was developed by using a photo-sensitive material 210 mm in outside diameter made of a ZnO master sheet, a magnetic toner having a volumetric resistivity of $10^{15}$ $\Omega$cm under an electric field of 4000 V/cm, and a developing device similar to that in Example 1. The peripheral velocity of the photo-sensitive material was 65 mm/sec. An aluminum sleeve 32 mm in outside diameter was rotated at 100 r.p.m., which a magnet roll made up of eight symmetrically arranged magnetic poles and having a magnetic force of 1300 gauss on the surface of the sleeve was rotated at 750 r.p.m. The development gap and the doctor gap was set to 0.8 mm and 1.0 mm, respectively. The directions of rotation of the photo-sensitive material, the sleeve and the magnet roll were the same as those in Example 1. The toner movement speed was about 69 mm/sec.

A toner image formed on the photo-sensitive material was transferred onto a transferring sheet similar to that in Example 4 by corona discharge, and the sheet was subjected to pressure fixing. As a result, an excellent copy was obtained which was excellent in both development and transferring characteristics, sufficient in density, and had no fog.

EXAMPLE 6

An electrostatic latent image having a surface potential of $-52$ V was developed by using a photo-sensitive material similar to that in Example 1, a magnetic toner having a volumetric resistivity of $10^{13}$ $\Omega$cm under an electric field of 4000 V/cm, and a developing device similar to that in Example 1. The peripheral velocity of the photo-sensitive material was 150 mm/sec. An insulating sleeve 32 mm in outside diameter fabricated by covering a stainless steel cylinder with "Mylar": 50$\mu$ in thickness was rotated at 95 r.p.m., while a magnet roll made up of twelve symmetrically arranged magnetic poles and having a magnetic force of 1200 gauss on the surface of the sleeve was rotated at 850 r.p.m. The development gap and the doctor gap were set to 0.75 mm and 1.0 mm, respectively. The directions of rotation of the photo-sensitive material, the sleeve and the magnet roll were the same as those in Example 1. The toner movement speed was about 44 m/sec. The toner container and the doctor blade were grounded.

A toner image formed on the photo-sensitive material was transferred onto a transferring sheet similar to that in Example 1 by corona discharge, and the sheet was subjected to thermal fixing with a heat roll at 170° C. As a result, an excellent copy was obtained which was excellent in both development and transferring characteristics, sufficient in density, and had no fog.

In this Example, when a bias voltage $+900$ V was applied across the stainless steel cylinder and the rear surface of the Se drum, an excellent reversal copy image was obtained.

EXAMPLE 7

An electrostatic latent image having a surface potential of $-600$ V was developed by using a PVK-TNF type OPC photo-sensitive material 210 in outside diameter, a magnetic toner having a volumetric resistivity of $10^9$ $\Omega$cm under an electric field of 4000 V/cm, and a developing device similar to that in Example 1. The peripheral velocity of the photo-sensitive material was set to 160 mm/sec. A stainless steel sleeve 32 mm in outside diameter was rotated at 120 r.p.m., while a magnet roll made up of eight symmetrically arranged magnetic poles and having a magnetic force of 1200 gauss on the surface of the sleeve was rotated at 1200 r.p.m. The development gap and the doctor gap were set to 0.8 mm and 1.0 mm. The directions of rotation of the photo-sensitive material, the sleeve and the magnet roll were the same as those in Example 1. The toner movement speed was about 37 mm/sec., in this case.

A toner image formed on the photo-sensitive material in this manner was transferred onto a transferring sheet similar to that in Example 3, and the sheet was subjected to pressure fixing. As a result, an excellent copy was obtained which was excellent in both development and transferring characteristics, sufficient in density, and had no fog.

EXAMPLE 8

An electrostatic latent image having a surface potential of $-600$ V was developed by using a photo-sensitive material similar to that in Example 7, a magnetic toner having a volumetric resistivity of $10^{10}$ $\Omega$cm under an electric field of 4000 V/cm, and a developing device similar to that in Example 1. The kind of the sleeve, the peripheral velocity and direction of movement of the photo-sensitive material, the r.p.m. and directions of rotation of the sleeve and magnet roll, and the toner movement speed were equal to those in Example 7. However, the magnet roll was made up of eight symmetrically arranged magnetic poles, and had a magnetic force of 550 gausses on the surface of the sleeve, and the development gap and the doctor gap were set to 0.5 mm and 0.2 mm, respectively.

A toner image formed on the photo-sensitive magerial in this matter was transferred onto a transferring sheet similar to that in Example 7 by corona discharge, and the sheet was subjected to thermal fixing. As a result, an excellent copy was obtained which is excellent in both development and transferring characteristics, sufficient in density, and had no fog.

What is claimed is:

1. In a method of electrophotography where an electrostatic latent image is formed on the surface of a material layer, a non-magnetic cylinder is provided to confront said surface of said material layer, a permanent magnet roll having a plurality of symmetrically arranged magnetic poles extending axially is provided in said cylinder, a magnetic brush is formed by attracting a semiconducting or insulating magnetic toner having a volumetric resistivity greater than $10^8$ $\Omega$cm under an electric field of DC 4000 V/cm onto said cylinder with the aid of a magnetic attraction force of said permanent magnet roll, said cylinder and permanent magnet roll are moved relatively to permit said magnetic brush to slide along the surface of said material layer thereby to allow said magnetic toner to stick to a predetermined position on the surface of said material layer, and a toner image is transferred onto a transferring member and is then subjected to fixing, the improvement comprising; said permanent magnet roll having a magnetic force in the range of 400–1600 gauss rotating said cylinder and said permanent magnet roll in the same direction as the direction of movement of said magnetic toner which is moved in the same direction as that of said material layer and at a speed less than 100 mm/sec irrespective of the speed of movement of the surface of said material layer at a development section, wherein the number of revolutions per minute of said permanent magnet roll is set to a value P defined by:

$$P = V / \frac{N_M}{60} \cdot M$$

where:

$N_M$ is the r.p.m. of said permanent magnet roll,

V is the speed of movement of the surface of said material layer, expressed by the mm/sec., M is the number of magnetic poles forming said permanent magnet roll, and P is in the range of 0.2 to 2.5, the r.p.m. of said non-magnetic cylinder is in a range of 1/5 to 1/20 of the r.p.m. of said permanent magnet roll.

2. The method as claimed in claim (1), further comprising using a developing device having at least one part of said non-magnetic cylinder in a toner container containing said magnetic toner, and wherein the magnetic attraction force of said permanent magnet roll acts directly on said magnetic toner in said toner container.

3. The method as in claim 1, wherein said non-magnetic cylinder is made of an electrically conductive material, and providing electrical means operating to eliminate the charges which are accumulated in magnetic toners left on said non-magnetic cylinder and not developed which interrupt development to electrically neutralize said magnetic toners, in a developing process.

4. The method as in claim 1, further comprising the steps of, in addition to said non-magnetic cylinder, bringing electric means into contact with said magnetic toner to eliminate charges which are accumulated in magnetic toners remaining on said non-magnetic cylinder and not yet developed which interrupt development to electrically neutralize said magnetic toners, in a developing process.

5. The method as in claim 1, wherein at least the outer wall of said non-magnetic cylinder is electrically insulated, and providing electrical means at a predetermined position between a development completion position and a toner supplying means, said electrical means operating to electrically neutralize the charges which are accumulated in magnetic toners remaining on said non-magnetic cylinder and not yet developed which interrupt development.

6. The method as in claims 3, 4 or 5 wherein said electrical means is grounded as is electrically connected to the rear surface of said material layer.

7. The method as in claims 3, 4 or 5 wherein said electrical means comprises AC corona ions or ions opposite in polarity to said accumulated charges.

8. The method as in claims 3, 4 or 5 wherein said electrical means comprises a DC voltage source adapted to apply a voltage opposite in polarity of said accumulated charges.

9. The method as in claim 1, wherein an electrically conductive cylinder on the outer wall of which an insulating layer is formed is employed as said non-magnetic cylinder and further comprising the steps of applying a bias voltage between said electrically conductive cylinder and the rear surface of said material layer to reverse an electrostatic latent image to allow magnetic toners to stick to a non-charged part of said material layer, and providing electrical means to electrically neutralize the charges which are accumulated in magnetic toners remaining on said non-magnetic cylinder and not yet developed which interrupt development.

10. The method as in claim 1, wherein said non-magnetic cylinder and said permanent magnet roll are rotated in a direction opposite to the direction of movement of said magnetic toner, and the r.p.m. of said non-magnetic cylinder is in a range of 1/20 to 1/200 of the r.p.m. of said permanent magnet roll.

11. The method as in claims 1, 2, 3, 4, 5, 9, or 10 wherein the gap (mm) between said material layer and said non-magnetic cylinder at a development section, and a toner regulating amount (mm) are in a region is defined by straight lines connecting coordinates (0.1, 0.2), (1.0, 0.9), (1.0, 1.3) and (0.1, 0.6) in FIG. 4 of the accompanying drawings.

12. The method as in claim 11, wherein said material layer is of a Se group, said toner regulating amount is less than 0.5 mm, and where said material layer is of a ZnO group or an OPC group, the toner regulating amount if more than 0.5 mm.

13. The method as in claim 1 wherein a magnetic toner having a volumetric resistivity of $10^{15}$ Ωcm under application of an electric field of DC 4000 V/cm is used, and a transferring sheet is used which has a smoothness from 20 sec to 100 sec, a gas-permeability from 25 sec to 800 sec, a saturation potential from 150 V to 1000 V at 20° C. and 60% RH and at the time of approximately −7 KV dynamic corona charging, a volumetric resistivity from $10^{11}$ Ωcm to $10^{14}$ Ωcm under application of an electric field of DC 10,000 V/cm, and a surface potential from $10^{10}$Ω to $10^{14}$Ω under application of a voltage of DC 1000 V.

14. The method as in claim 13, wherein a transferring sheet is used which has a charging characteristic that an initial charging potential has a peak value in a range of from 200 V to 700 V, said potential being thereafter abruptly decreased to be in a range of 150 to 300 V with the lapse of time and maintained in said range.

* * * * *

UNITED STATES PATENT AND TRADEMARK OFFICE
CERTIFICATE OF CORRECTION

PATENT NO. : 4,309,498

DATED : January 5, 1982

INVENTOR(S) : Keitaro Yamashita et al

It is certified that error appears in the above—identified patent and that said Letters Patent is hereby corrected as shown below:

On the title page
Foreign Application Priority Date should read -- March 23, 1979

[JP]   Japan   54-34044 --

Signed and Sealed this

Twenty-first Day of September 1982

[SEAL]

Attest:

GERALD J. MOSSINGHOFF

Attesting Officer

Commissioner of Patents and Trademarks